(12) United States Patent
Yadav

(10) Patent No.: US 11,591,276 B2
(45) Date of Patent: Feb. 28, 2023

(54) SYSTEM AND METHOD FOR MANUFACTURING POLYMER COATED CONTROLLED RELEASE FERTILIZERS

(71) Applicant: Santosh Kumar Yadav, Vadodara (IN)

(72) Inventor: Santosh Kumar Yadav, Vadodara (IN)

(73) Assignee: Cotex Technologies Inc., Sydney (CA)

( * ) Notice: Subject to any disclaimer, the term of this patent is extended or adjusted under 35 U.S.C. 154(b) by 508 days.

(21) Appl. No.: 16/125,726

(22) Filed: Sep. 9, 2018

(65) Prior Publication Data

US 2020/0079704 A1 Mar. 12, 2020

(51) Int. Cl.
*C05G 3/20* (2020.01)
*C05G 5/30* (2020.01)
*C05G 5/35* (2020.01)

(52) U.S. Cl.
CPC .......... *C05G 5/37* (2020.02); *C05G 3/20* (2020.02); *C05G 5/35* (2020.02)

(58) Field of Classification Search
CPC ... C05G 5/37; C05G 3/20; C05G 5/35; C05G 5/14; C05C 9/005
See application file for complete search history.

(56) References Cited

U.S. PATENT DOCUMENTS

| | | | |
|---|---|---|---|
| 4,019,890 A | 4/1977 | Fujita et al. | |
| 4,042,366 A | 8/1977 | Fersch et al. | |
| 4,369,055 A | 1/1983 | Fujita et al. | |
| 5,147,443 A | 9/1992 | Diehr et al. | |
| 5,176,734 A | 1/1993 | Fujita et al. | |
| 5,186,732 A | 2/1993 | Thompson et al. | |
| 5,211,985 A | 5/1993 | Shirley, Jr. et al. | |
| 5,374,292 A | 12/1994 | Detrick et al. | |
| 5,435,821 A | 7/1995 | Duvdevani et al. | |
| 5,858,094 A | 1/1999 | Detrick et al. | |
| 6,139,597 A | 10/2000 | Tijsma et al. | |

(Continued)

FOREIGN PATENT DOCUMENTS

| | | |
|---|---|---|
| EP | 1 120 436 | 8/2001 |
| WO | 2011/126713 | 10/2011 |

OTHER PUBLICATIONS

British Plastics Federation ("Thermoforming", 2008, accessed from www.bpf.co.uk; referenced hereinafter as "BPF") (Year: 2008).*
Shogren ("Water vapor permeability of biodegradable polymers", Journal of Environmental Polymer Degradation, vol. 5, No. 2, 1997, p. 91-95) (Year: 1993).*
Yang et al ("Improving the Quality of Polymer-Coated Urea with Recycled Plastic, Proper Additives, and Large Tablets", J. Agric. Food Chem. 2012, 60, 11229-11237) (Year: 2012).*

(Continued)

*Primary Examiner* — Jennifer A Smith
(74) *Attorney, Agent, or Firm* — Bereskin & Parr LLP

(57) ABSTRACT

A system and method are provided for manufacturing the polymer-coated fertilizers with a controlled release in a single pass. The system has a feeding mechanism connected to a first chill roll to supply the articles to the first cavities provided on the first roll to store and hold the articles. A first machine produces and applies a first polymer film on the articles held in the first chill roll to coat the articles partially with the first polymer film. The partially coated articles are transferred to a second chill roll placed at a side or on a top of the first chill roll. A second machine produces and applies the second polymer film on the partially coated articles in the second chill roll so that the articles are encapsulated by the first and second polymer films. A collector mechanism receives the encapsulated articles from the second chill roll.

27 Claims, 8 Drawing Sheets

(56) References Cited

U.S. PATENT DOCUMENTS

| | | |
|---|---|---|
| 6,231,633 B1 | 5/2001 | Hirano et al. |
| 6,338,746 B1 | 1/2002 | Detrick et al. |
| 6,398,989 B1 | 6/2002 | Bergstrom |
| 6,676,869 B2 | 1/2004 | Berg et al. |
| 6,987,082 B2 | 1/2006 | Tijsma et al. |
| 7,018,441 B2 | 3/2006 | Tabei |
| 7,931,729 B2 | 4/2011 | Santosh |
| 8,211,201 B2 | 7/2012 | Yadav |
| 2009/0044582 A1* | 2/2009 | Yadav .................... C05F 11/00 71/64.07 |
| 2009/0047523 A1 | 2/2009 | Keedy, Jr. |
| 2010/0113671 A1 | 5/2010 | Kinouchi |
| 2012/0056346 A1 | 3/2012 | Maurer et al. |

OTHER PUBLICATIONS

Wang, Shijun, et al. "Two-step heat fusion kinetics and mechanical performance of thermoplastic interfaces." Scientific reports 12.1 (2022): 1-13. (Year: 2022).*
International Search Report, dated Jan. 17, 2014, from corresponding PCT application PCT/US13/55486.
Office Action, dated Mar. 16, 2017, from corresponding parent U.S. Appl. No. 14/421,598.
Office Action, dated Nov. 1, 2017, from corresponding parent U.S. Appl. No. 14/421,598.
Office Action, dated Mar. 9, 2018, from corresponding parent U.S. Appl. No. 14/421,598.
Written Opinion, dated Jan. 17, 2014, from corresponding PCT application PCT/US13/55486.

* cited by examiner

SYSTEM AND METHOD FOR MANUFACTURING POLYMER COATED CONTROLLED RELEASE FERTILIZERS

CROSS REFERENCE TO RELATED APPLICATION

The present application is continuation-in-part of Ser. No. 14/421,59, filed Feb. 13, 2015. The content of the above-mentioned document is incorporated entirely by reference herein.

BACKGROUND

Technical Field

The embodiments herein generally relate to fertilizers and particularly to polymer coated fertilizers. The embodiments herein more particularly relate to a system and method for manufacturing polymer-coated fertilizers with a controlled release mechanism for plants and crops.

Description of the Related Art

A fertilizer is an organic or inorganic material of natural or synthetic origin that is added to a soil to supply one or more plant nutrients essential for the growth of the plants. Fertilizers are broadly divided into organic fertilizers (composed of plants or animal matters), or inorganic/commercial fertilizers. Plants absorb the required nutrients only when they are present in a form of easily dissolved chemical compounds. Both the organic and inorganic fertilizers provide the same chemical compounds that are needed. The organic fertilizers provide both macro and micro nutrients. The macro and micro nutrients are released as the organic matter decay. The decay may take months or years. Further the organic fertilizers have lower concentrations of plant nutrients and have the usual problems of economical collection, treatment, transportation and distribution. Inorganic fertilizers are readily dissolved and applied to the soil. The dissolved inorganic fertilizers is readily taken by the plant roots.

Most of the commercially available fertilizers, when applied to the lawns or agricultural crops, dissolve rapidly in the moisture of the soil. Often, such fertilizers dissolve at a rate that exceeds the rate in which it is absorbed by the plants. This causes a number of significant problems. First, the excess fertilizer can leach into the groundwater thereby generating a potentially serious environmental damage. In addition to the above, an excessive concentration of the fertilizers in the vicinity of a plant may result in a burning or damage of the plant roots. Because of these problems, it is often necessary to apply these fertilizers in several light doses throughout the growing season, rather than in a single heavy application. However, the need for repeated applications increases a cost of the labor. At worse, the repeated applications may cause a physical damage to the growing plants because the fertilizer spreading equipment must pass over the plants for several times.

In order to minimize the loss of fertilizer into the environment and to avoid the need for the repeated applications, various slow or controlled release fertilizers have been developed. The U.S. Pat. Nos. 4,042,366, 5,147,443, 5,435,821, and 6,231,633 disclose such controlled release fertilizers. These fertilizers are applied at the beginning of the growing season to facilitate a higher release of fertilizer in the initial growing period followed by a slower release or gradual release of fertilizer throughout the growing season. The slow or controlled release fertilizers are widely used on the agriculture crops, home lawns, public lawns, golf courses, home gardens, plant nurseries, and for horticultural crops.

The polymer coated fertilizers are the most technically advanced controlled release fertilizers. Many manufacturing methods are developed and used to produce polymer-coated fertilizers and they are disclosed in the U.S. Pat. Nos. 4,019,890, 4,369,055, 5,176,734, 5,211,985, 5,374,292, 5,858,094, 6,338,746, and 8,211,201. The polymer coated controlled release fertilizers are typically produced by coating a water insoluble semi-permeable polymer layer onto the fertilizer granules. The fertilizer is released over a time period into the soil by diffusion through this semi-permeable coating.

One of the popular methods of manufacturing the polymer-coated fertilizers is by reacting the chemical monomers onto the surface of the granule to form a polymer film. This method is called a reactive layer coating in which a polyurethane polymer is formed. Another popular method of manufacturing the polymer coated fertilizers is by spraying a solution of polymer onto the fertilizer granules and evaporating the solvent thereby forming a polymer film coating. This method is called fluidized bed coating and it requires an expensive solvent and a solvent recovery system.

The most critical aspect of the controlled-release fertilizers is the moisture permeability of the coating, which is affected by the thickness and the molecular structure of the coating. The release of fertilizer takes place via diffusion through the coating and the uniformity of the release rate depends on the uniformity of the coating. An uneven coating thickness will have uneven moisture transmission rate and hence the quality of the controlled-release products will also vary.

Another critical shortcoming of the existing coating technologies is that these coating processes spray polymer solution onto a plurality of fertilizer granules which are tumbling and rolling in a random fashion inside a rotary drum or in a vertical column of fluidized bed. The uneven shaped granules produce completely random rolling pattern thus the coating cannot be directed and this results into an uneven coating thickness. This problem worsens when the shape is extremely uneven or non-spherical such as the fertilizer products made by compaction process, which have highly uneven shape. Thus all existing coating technologies require expensive premium grade round fertilizer granule with smooth surfaces (U.S. Pat. No. 6,139,597 A) so that non-uniformity of the coating can be minimized.

The disadvantages suffered by the existing process are that either these methods are polymer specific such as polyurethane processes or the process requires an expensive solvent to produce the coating in case of fluidized bed coating. All these methods produce the products that are very expensive and sometimes the cost is equal to 4-6 times the prices of the conventional fertilizers. The primary reason for the expensive nature is the use of expensive polymers or the use of an expensive solvent or both. Yet another disadvantage is that most of these manufacturing processes are batch type processes, which are expensive.

Another disadvantage with the existing processes is that they require multiple applications of polymer to increase the thickness of the polymer coating around the fertilizer, as disclosed in U.S. Pat. No. 7,018,441 B2. For example, it requires nearly 16 applications of the polyurethane polymer to achieve a coating thickness of 8%. A coating thickness 0.5% only is achieved in each application and hence more time and energy are required for multiple applications thereby increasing the production cost.

Yet another disadvantage of the existing coating technologies is that the fertilizer granules with lower compression or crushing strength cannot be coated due to turbulence in the coating system.

A manufacturing process is disclosed in the U.S. Pat. No. 8,211,201 to overcome the above-mentioned disadvantages. But one disadvantage of this process is the use of molten fertilizer as a feed to produce the coated fertilizers thereby leaving a majority of fertilizer granules including fertilizers in tablet, spikes, pellet, or briquette form. The melting and solidifying of the fertilizer granules requires a substantial amount of energy, which increase the production cost and many fertilizers cannot be produced in melt form for use in this process. Additionally the process produces the coated products in hemispherical or pastille shape which may not be appealing to many users.

Hence there is a need for an economical system and method for manufacturing polymer coated controlled release fertilizers continuously to enable the use any available fertilizer granule in any shape and form for producing polymer coated products with uniform coating thickness The above mentioned shortcomings, disadvantages and problems are addressed herein and which will be understood by reading and studying the following specification.

OBJECTS OF THE EMBODIMENTS

Definitions of the Terms Used and Objects of the Embodiments

"Continuous polymer film" would generally mean a polymer film of unbroken structure "Continuous Coating layer" would generally mean an unbroken coating structure "Continuous Coating process" would generally mean a process of applying coating is uninterrupted "Continuous structure" would generally mean an unbroken structure "Coating edge" or "edge" unless specified, would generally mean a narrow strip of coating layer at the end of the coating layer "Uncoated surface area" would generally mean a surface area without any coating "Composite Layer" would generally mean a layer made up of more than one layer of same or different material "Overlap Layer" would generally mean a layer formed by two edges of two separate layers, where an edge of one layer goes over the edge of another layer forming the overlap layer "Distinct Layer" would generally mean a layer which is chemically, physically, or structurally different from other layers that are a part of the same structure, the distinctness of the layer is visible either through the microscope or to the naked eye.

"Sealing layer" would generally mean when an edge of one polymer layer is joined or welded with an edge of another polymer layer to form a continuous structure "Distinct Sealing Layer" would generally mean a sealing layer which is different than the rest of the continuous layer and appear as distinct layer when viewed through the microscope and sometimes to the naked eye.

"Partially coated fertilizer" would generally mean a coated fertilizer pellet having a continuous coating that covers only a part of the total surface area of the fertilizer pellet "Melt fusion" would generally mean when two polymer layers are bonded together with the assistance of heat; melt fusion alters the polymer structure of the composite layer formed due to the polymer chain entanglement.

"Thermal Lamination" would generally mean bonding of two polymer layers under heat "Cold lamination" would generally mean bonding of two polymer layers using chemical bonding method such as using a curable/cold adhesive to bond two layers "Film Extrusion" would generally mean extrusion of flat polymer film using conventional extrusion equipment such as cast film extrusion "Extrusion Coating" would generally mean coating of polymer by using conventional extrusion coating equipment such as film extruder and extrusion coating die "Slot Die Coating" would generally mean coating of polymer using slot die coating equipment such as a slot die coating system supplied by Nordson Corporation, Ohio, USA "Melt Spray Coating" would generally mean coating of a substrate by spraying of a molten polymer material "Commercial films" would generally mean polymeric films supplied by film manufacturers "Commercial polymers" would generally mean ready to use polymeric materials available for film extrusion from commercial suppliers including blends that can be prepared from the extrusion grade commercial resin.

"Polymer Melt" would generally mean a polymer film or coating layer in a softened state so that the film can be molded or thermoformed "solid article" would generally mean any three-dimensional article that can hold its shape un-assisted "fertilizer pellet" would generally mean any commercially available fertilizer of any shape (tablet, briquette, spike, granular, compacted)

"physical properties" "chemical properties", or "mechanical properties" are properties as understood in the polymer film industry "band" would generally mean a strip of coating layer The primary object of the embodiments herein is to provide a system and method for manufacturing a polymer coated controlled release fertilizers with a desired coating of uniform thickness in a single pass and in a high speed.

Another object of the embodiments herein is to develop a system and method for manufacturing polymer coated granules to enable a use of fertilizer granule of even and irregular shapes.

Yet another object of the embodiments herein is to develop a system and method for manufacturing a polymer coated controlled release fertilizers to enable a use of fertilizers in tablets, spikes, briquettes, or pellets shape.

Yet another object of the embodiments herein is to develop a system and method for manufacturing polymer-coated fertilizers to obtain a polymer coated fertilizer that prevents caking or agglomeration during transportation.

Yet another object of the embodiments herein is to develop a system and method for manufacturing a polymer coated controlled release fertilizers to enable a use of any commercially available polymer to coat the fertilizer without requiring any solvent or curing, or catalyst for forming the coating onto the fertilizer granule.

Yet another object of the embodiments herein is to develop a system and method for manufacturing a polymer coated controlled release fertilizers to allow a complete control of coating application onto the fertilizer granules to achieve a uniform and precise coating thickness.

Yet another object of the embodiments herein is to develop a system and method for manufacturing a polymer coated controlled release fertilizers to apply multiple polymer layers simultaneously thereby allowing the manufacturer to produce the fertilizers coated with multiple polymer layers.

Yet another object of an embodiment herein is to develop a system and method for manufacturing a polymer coated controlled release fertilizers to obtain the polymer coated fertilizer and fertilizer products with a desired coating thickness in a single pass thereby saving time, space and energy.

Yet another object of an embodiment herein is to develop a system and method for manufacturing a polymer coated controlled release fertilizers to obtain the polymer coated fertilizers and fertilizer products with a desired water vapor transmission rate (WVTR) thereby making a highly effective controlled release fertilizer products.

Yet another object of an embodiment herein is to develop a system and method for manufacturing a polymer coated controlled release fertilizers to obtain polymer coated fertilizers and fertilizer products with a desired duration of biodegradation so that the coating is degraded in a predetermined duration These and other objects and advantages of the embodiments herein will become readily apparent from the following detailed description taken in conjunction with the accompanying drawings.

SUMMARY

The various embodiments herein, provide a system and method for manufacturing polymer-coated fertilizers. According to an embodiment herein, the fertilizer granules are coated in two steps. In the first step, the first surface area of the fertilizer pellets are coated by a continuous first coating layer, this creates a partially coated pellet with one surface coated with a continuous first coating layer. Thereafter a second continuous coating layer is applied onto the remaining uncoated surface of the fertilizer granule to coat the remaining uncoated surface of the pellet. The application of the second coating layer coats the second surface in a continuous coating layer and also creates an overlap layer with the first coating layer where an edge of the second continuous polymer film goes over the edge of the first coating layer and binds with it. The overlap layer is a distinct layer from the first coating layer and the second coating layer, and is visible as a distinct layer when viewed under the microscope in all the embodiments, and to the naked in some embodiments. The encapsulated fertilizer between the first coating layer, the second coating layer, and the overlap layer is releasable over a time period or interval by diffusion through the first coating layer, the second coating layer, or the overlap layer.

Overlap layer formed by melt fusing the edge of the first coating layer with the edge of the second coating layer is a composite layer, since it is made by joining two polymer structures the properties of the overlap layer such as chemical properties, physical, properties, or mechanical properties would be distinct from the first coating layer and the second coating layer due to the change in thickness of the overlap layer, change in polymer chain rearrangement, change in crystalline structure, or air bubbles getting trapped in the interface layer of two edges of the two coating layers.

According to an embodiment herein, a polymer coated fertilizer pellet encapsulated in three layers; a first coating layer, a second coating layer, and an overlap layer. The fertilizer is releasable through the first coating layer, the second coating layer, or the overlap layer. The three layers are a part of a continuous structure where the first coating layer is on one side and the second coating layer are on the other side of the overlap layer, the first coating layer covers a part of the surface area of the pellet, a second coating layer covers another part of the surface area of the pellet, and the overlap layer where an edge of the first coating layer joins with an edge of the second coating layer to form the overlap layer covers a different part of the surface area of the pellet, According to an embodiment herein, first coating layer and the second coating layer are separated by a narrow strip of overlap layer such that the first coating layer is on the one side and the second coating layer is on the another side of the overlap layer.

According to an embodiment herein, a polymer encapsulated fertilizer pellet having its surface area covered by three layers; first coating layer covering a first surface, a second coating layer covering a second surface area, and overlap layer covering a third surface area of the pellet, wherein the first surface area, the second surface area, and the third surface area are different surface areas of the fertilizer pellet.

According to an embodiment herein, a method of manufacturing polymer coated fertilizer comprising; coating a first surface of a fertilizer pellet with a first continuous polymer film, thereafter applying a second continuous polymer film to coat a second surface of the fertilizer pellet, and sealing a part of the first polymer film with a part of the second polymer film onto the surface of fertilizer pellet so that the fertilizer pellet is completely encapsulated between the first polymer film, the second polymer film, and the distinct overlap layer. The coating layer encapsulating the fertilizer pellet having first polymer film, second polymer film, and the overlap layer whereas the overlap layer seals the two polymer films onto the surface of the fertilizer pellet such that the first polymer film is on one side of the overlap layer while the second polymer film is on the other side of the sealing layer, the polymer coated fertilizer produced herein releases the fertilizer through the first polymer film, the second polymer film, or the sealing layer in a controlled-release manner when applied to the soil.

According to an embodiment herein, a method of manufacturing polymer coated fertilizer comprising; placing plurality of fertilizer pellets into a plurality of housing cavity, applying a first continuous coating layer onto the first surface area of the fertilizer pellet, thereafter a vacuum suction is applied underneath the fertilizer pellets through an opening in the cavity, the vacuum suction pulls the first coating layer around the fertilizer pellet coating the first surface area with the first continuous coating layer creating a partially coated fertilizer pellet, thereafter the partially coated fertilizer pellets are turned over to expose the uncoated surface area of the partially coated fertilizer pellets. Thereafter, a second continuous coating layer is applied onto the partially coated fertilizer pellets, the second coating layer is applied to coat the second surface area of the fertilizer pellets, the second coating layer coats the remaining uncoated surface area of the partially coated fertilizer pellets, and an edge of the second coating layer goes over an edge of the first coating layer creating an overlap layer area between the first coating layer and second coating layer, wherein the overlap layer comprises a part of the first coating layer and a part of the second coating layer bonded together to form a composite layer that is distinct from the first coating layer and the second coating layer, the second coating layer forms the top layer of the overlap layer and the first coating layer forms the bottom layer of the overlap layer, the overlap layer runs along the circumference of the fertilizer pellet encircling the fertilizer pellet, the overlap layer appears as a distinct layer either through the naked eye or when viewed under the microscope, the fertilizer pellet encapsulated between the first coating layer, the second coating layer, and the overlap layer is releasable through the first coating layer, the second coating layer, or the overlap layer.

According to an embodiment herein, a fertilizer pellet is encapsulated in three distinct coating layers covering three different surfaces of the fertilizer pellet; first continuous coating layer covers a first surface area, a second continuous layer covers a second surface area, and a composite layer covers a third surface area, wherein the first coating layer, the second coating layer, and the composite layer are distinct from each other, the first coating layer, the second coating layer, and the composite layer form a single continuous coating structure that encapsulate the fertilizer pellet.

According to an embodiment herein, a polymer coated fertilizer pellet comprises; a fertilizer pellet, a first continuous coating layer covering a first surface area of the fertilizer pellet, a second continuous coating layer covering a second surface area of the fertilizer pellet, and an overlap area covering a third surface area of the fertilizer pellet, the overlap layer laminates the first coating layer and the second coating layer onto the surface of the fertilizer pellet so that the fertilizer pellet is completely encapsulated between the first continuous coating layer, the second continuous coating layer, and the overlap layer. The first coating layer and the second coating layer are on the opposite surfaces of the fertilizer pellet coating different surfaces of the fertilizer pellet, overlap layer is a composite layer comprising an edge of the first coating layer and an edge of the second coating layer; the fertilizer pellet encapsulated between the first coating layer, the second coating layer, and the overlap layer is controlled-release fertilizer and is releasable through the first coating layer, the second coating layer, and/or the overlap layer providing nutrients or the plant protectant to the growing plant.

According to an embodiment herein, a system for coating a plurality of articles in a continuous process using a melt extruded polymer film is provided. The system comprises; placing the solid articles in a housing cavity, extruding a first polymer film onto the first surface of the solid article, applying vacuum to coat first polymer film around the first surface of the solid articles, the application of the first polymer film creates a partially coated solid articles where the first polymer film covers the first surface of the solid article, thereafter turning over the partially coated solid articles to expose the second surface of the partially coated solid article, the second surface of the solid article is the uncoated surface of the sold article, thereafter a second polymer film is extruded and applied onto the second surface of the partially coated fertilizer, vacuum is applied underneath the partially coated fertilizer so as to thermoform the second polymer film around the second surface of the solid pellet and also to melt fuse a part of the second polymer film with a part of the first polymer film forming a melt fused overlap layer comprising an edge of the first polymer film and an edge of the second polymer film; the solid article encapsulated between the first coating layer, the second coating layer, and the overlap layer is releasable through the first coating layer, the second coating layer, or the overlap layer in a controlled-release manner.

According to an embodiment herein, the thickness of the first coating layer, the second coating layer, and the composite layer is within a range of 5 microns to 300 microns.

The desired temperature at which the first coating layer and the second coating layer is coated around the surface of the fertilizer pellet is between a range of 50 degree centigrade to 500 degree centigrade. The desired chemical property of the first coating layer and the second coating layer is water vapour transmission rate (WVTR), as understood in the polymer film industry. The WVTR value of the first coating layer, the second coating layer, and the composite layer is between the range of 1 g/(m$^2$·day) to 2000 g/(m$^2$·day).

According to an embodiment herein, the desired thickness of the first polymer film, the second polymer film, and composite film is within a range of 5 microns to 300 microns. The desired chemical property of the first polymer film, the second polymer film, and the composite film is water vapour transmission rate (WVTR). The WVTR value of the first polymer film and the second polymer film is within a range of 1 g/(m$^2$·day) to 2000 g/(m$^2$·day).

According to one embodiment herein, the first and second polymer film is made from any extrusion grade polymer capable of producing a film. The polymer film can be applied as coating layer wherein the surface temperature of the film is between a range of 50° C. to 500° C. at the time of coating.

According to an embodiment herein, a system for coating a plurality of articles in a continuous process using a polymer melt is provided. The system comprises a feeding mechanism connected to a first chill roll to supply a plurality of articles. The first chill roll comprises a plurality of first cavities on a peripheral surface and the plurality of first cavities houses and holds a plurality of articles. A first machine is provided for producing a first molten film and applying the first molten film on the plurality of articles held in the plurality of first cavities in the first chill roll to partially coat the plurality of articles with the first molten film. A second chill roll is placed at a side of the first chill roll or the second chill roll is placed on a top side of the first chill roll to receive a plurality of articles partially coated with a first molten film. A second machine is provided for producing and applying the second molten film on the plurality of articles held in the plurality of second cavities in the second chill roll and partially coated with the first molten film. A collector mechanism is provided to receive the plurality of articles coated with the first molten film and the second molten film from the second chill roll.

According to an embodiment herein, a system for coating a plurality of articles in a continuous process using a polymer melt is provided. The system comprises a first chill roll, a second chill roll, a first machine, a second machine, a feeding mechanism and a collector mechanism.

According to an embodiment herein, the first chill roll comprises a plurality of first cavities on a peripheral surface and the plurality of first cavities houses and holds a plurality of articles.

According to an embodiment herein, the second chill roll is identical to the first chill roll. The second chill roll is placed at a side of the first chill roll or the second chill roll is placed on a bottom side of the first chill roll. The second chill roll comprises a plurality of second cavities on a peripheral surface. The plurality of second cavities houses and holds a plurality of articles received from the first chill roll. The plurality of second cavities in the second chill roll matches with the plurality of first cavities in the first chill roll. The plurality of second cavities in the second chill roll and the plurality of first cavities in the first chill roll are arranged to face each other.

According to an embodiment herein, the system comprises a first machine for producing a first molten film and applying the first molten film on the plurality of articles held in the plurality of first cavities in the first chill roll to partially coat the plurality of articles with the first molten film. The first molten film has a desired thickness, width and chemical properties. The first machine comprises a first polymer extruder and a first film molding die. The first polymer extruder mixes, melts and extrudes a polymer to generate a homogenous melt of polymer. The first film molding die is attached to an end of the first polymer extruder for receiving a molten feed from the first polymer extruder to produce the first molten film of desired thickness and width. The polymer is a single polymer or a blend of polymers.

According to an embodiment herein, the system comprises a second machine for producing a second molten film and applying the second molten film on the plurality of articles held in the plurality of second cavities in the second chill roll. The second molten film has a desired thickness, width and chemical properties. The second machine comprises a second polymer extruder and a second film molding die. The second polymer extruder mixes, melts and extrudes a polymer to generate a homogenous melt of polymer. The second film molding die is attached to an end of the polymer extruder for receiving a molten feed from the second polymer extruder to produce the second molten film of desired thickness and width. The polymer is a single polymer or a blend of polymers.

According to an embodiment herein, the system comprises a feeding mechanism for feeding the plurality of articles to the first chill roll and a collection mechanism for collecting the plurality of articles from the second chill roll. The plurality of articles collected from the second chill roll are coated with the first polymer film at one side of the plurality of articles and with the second polymer film at an opposite side of the plurality of articles so that the plurality of articles are encapsulated within the first polymer film and the second polymer film. The plurality of articles is a controlled release article.

According to an embodiment herein, the plurality of articles is selected from a group consisting of a fertilizer, a pharmaceutical tablet, a detergent tablet, a biocide tablet, a pesticide granule, an animal feed and a food particle. The plurality of articles is water soluble. The plurality of articles is selected from a group consisting of a polymer coated articles.

According to an embodiment herein, the mean article size is within the range of 1 mm to 150 mm.

According to an embodiment herein, the system further comprises a cutting mechanism provided at the first chill roll and the second chill roll to cut the first polymer film and the second polymer film after application on the plurality of articles. The cutting mechanism is a sharp cutting edge provided on the surface of the first chill roll and the second chill roll.

According to an embodiment herein, the system further comprises a rotary pin to push the plurality of articles held at the plurality of second cavities in the second chill roll, when the second polymer film is applied on the plurality of the articles coated partially with the first polymer film.

According to an embodiment herein, the first chill roll is rotated in a clockwise direction through a desired angle for receiving the plurality of articles at the plurality of first cavities. The second chill roll is rotated in an anti-clockwise direction through a desired angle for receiving the plurality of articles at the plurality of cavities. The first chill roll and the second chill roll are rotated in a synchronized manner in the clockwise direction and in the anti-clockwise direction respectively so that at least one of the plurality of first cavities in the first chill roll is arranged opposite to at least one of the plurality of second cavities in the second chill roll to transfer the plurality of articles in the first cavities of the first chill roll to the plurality of second cavities in the second chill roll.

According to an embodiment herein, the first chill roll and the second chill roll comprise an internal fluid circulation mechanism for circulating a fluid to control a surface temperature of the first chill roll. The first chill roll and the second chill roll comprise a non-stick coating on an outer surface to avoid a sticking of the molten film onto the surface of the chill roll. The first chill roll and the second chill roll are rotatable cylindrical drums.

According to an embodiment herein, each of the plurality of first cavities and each of the plurality of second cavities hold one article. The plurality of first cavities and the pluralities of the second cavities are arranged in a shape selected from a group consisting of a tablet, spike, circular, rectangular, square and hexagonal shapes. Each one of the plurality of first cavities and each one of the plurality of second cavities holds at-least one article by a vacuum. The plurality of first cavities and the plurality of second cavities comprise an opening or hole in a bottom to provide the vacuum for holding the plurality of articles. A size of the plurality of first cavities is larger than a size of the plurality of articles and a size of the plurality of second cavities is larger than a size of the plurality of articles. The plurality of first cavities and the plurality of second cavities comprise a compressable cushion ring in a bottom. The cushion ring is made up of a material selected from a group consisting of a soft rubber material or a rubber like material.

According to an embodiment herein, the first polymer film die and the second polymer film die is any one of a curtain coating and a slot dye. The first polymer film die and the second polymer film die produce a single layer polymer film or a multilayer polymer film. According to an embodiment herein, the polymer is melt processed into a molten film of desired thickness.

According to an embodiment herein, the first polymer film is coated on the surface of the plurality of articles in a range of 1%-99%. The second polymer film is coated on the surface of the plurality of articles coated partially with the first polymer film in a range of 1%-99%.

According to an embodiment herein, the first polymer film and the second polymer film comprise one or more additives. The one or more additives are selected from a group consisting of hydrophilic additives, surfactants, inorganic minerals, biodegradable additives, pigments and water soluble additive. The hydrophilic additives are added for increasing a moisture permeability of the first polymer film and the second polymer film.

According to an embodiment herein, the inorganic mineral is selected from a group consisting of talc, calcium carbonate, mica, silica and their derivatives. The inorganic minerals are added for modifying a moisture permeability, reducing a temperature induced expansion of the first polymer film and the second polymer film, and reducing a tackiness of the first polymer film and the second polymer film, and preventing a caking or agglomeration of the plurality of articles coated with the first polymer film and the second polymer film.

According to an embodiment herein, wherein the biodegradable additives are added for adding a biodegradable characteristics to the first polymer film and the second polymer film and for expediting a biodegradation of the first polymer film and the second polymer film. The additives are added to the first polymer film and the second polymer film layer in a range of 0.01%-50% of a combined dry weight of the first polymer film and the second polymer film.

According to an embodiment herein, the desired thickness of the first polymer film and the second polymer film is within a range of 5 microns to 300 microns. The desired temperature of the first molten polymer film and the second molten polymer film is within a range of 50° C. to 500° c. The desired chemical property of the first polymer film and the second polymer film is water vapor transmission rate (WVTR). The desired WVTR of the first polymer film and the second polymer film is within a range of 0.001 $g/(m^2 \cdot day)$ to 20000 $g/(m^2 \cdot day)$.

According to an embodiment herein, a method is provided for coating a plurality of articles in a continuous process using a polymer. The method comprises extruding and applying a first coating layer with a first molten polymer film on a plurality of articles held on a plurality of first cavities in a first chill roll for generating a plurality of articles coated partially with the first polymer film. The plurality of articles coated partially with the first polymer film is transferred from the first chill roll to a second chill roll. An uncoated portion of the plurality of articles coated partially with the first polymer film is exposed. A second coating layer of a second molten polymer film is extruded and applied on the plurality of articles held on a plurality of second cavities in the second chill roll for generating a plurality of articles fully coated with the first polymer film and the second polymer film. The plurality of articles is encapsulated between the first coating layer and the second coating layer by sealing the first polymer film and the second polymer film coated on the plurality of articles by melt fusing the second polymer film with the first polymer film on an overlapping area of the first polymer film and the second polymer film. The encapsulated plurality of articles is released over a time period by a diffusion of the encapsulated plurality of articles through the first polymer film or the second polymer film.

According to an embodiment herein, the plurality of articles are held in the plurality of first cavities and in the plurality of second cavities by a vacuum suction adopted at a bottom of the plurality of first cavities and at the plurality of second cavities. A pulling force of the vacuum suction under the plurality of articles is adapted to pull the first polymer film and the second polymer film around the plurality of articles and to adhere the first polymer film and the second polymer film respectively to an opposing surface of the plurality of articles.

According to an embodiment herein, the mean article size is within 1 mm to 150 mm.

According to an embodiment herein, the first polymer film is coated on the surface of the plurality of articles in a range of 1%-99%. The second polymer film is coated on the surface of the plurality of articles coated partially with the first polymer film in a range of 1%-99%.

According to an embodiment herein, the polymer is melt processed into a molten film.

According to an embodiment herein, the first polymer film and the second polymer film comprises one or more additives. The one or more additives are selected from a group consisting of hydrophilic additives, surfactants, inorganic minerals, biodegradable additives, pigments and water soluble additive. The hydrophilic additives or surfactants are added for increasing a moisture permeability of the first polymer film and the second polymer film.

According to an embodiment herein, the inorganic mineral is selected from a group consisting of talc, calcium carbonate, mica, silica and their derivatives. The inorganic minerals are added for modifying a moisture permeability, reducing a temperature induced expansion of the first polymer film and the second polymer film, and reducing a tackiness of the first polymer film and the second polymer film, and preventing a caking or agglomeration of the plurality of articles coated with the first polymer film and the second polymer film.

According to an embodiment herein, the biodegradable additives are added for adding a biodegradable characteristic to the first polymer film and the second polymer film and for expediting a biodegradation of the first polymer film and the second polymer film.

According to an embodiment herein, the additives are added to the first polymer film and the second polymer film layer in a range of 0.01%-50% of a combined dry weight of the first polymer film and the second polymer film.

According to an embodiment herein, the desired thickness of the first polymer film and the second polymer film is within a range of 5 microns to 300 microns. The desired temperature of the first molten polymer film and the second molten polymer film is within a range of 50° C. to 500° c. The desired chemical property of the first polymer film and the second polymer film is water vapour transmission rate (WVTR). The WVTR value of the first polymer film and the second polymer film is within a range of 0.01 $g/(m^2 \cdot day)$ to 20,000 $g/(m^2 \cdot day)$.

According to an embodiment herein, the first chill roll and the second chill roll are rotatable cylindrical drums.

According to an embodiment herein, a method for manufacturing a controlled release fertilizer involves placing the fertilizer granules onto a surface and applying a first layer of polymer onto the exposed surface of the fertilizer granule. Then the uncoated portion of fertilizer is exposed and a second layer of polymer is applied to encapsulate the fertilizer granule between the first polymer layer and the second polymer layer such that the fertilizer granules are releasable over a time by a diffusion through at least one of the first polymer film or the second polymer film.

According to one embodiment herein, the manufacturing process of polymer-coated fertilizers has two main steps. In the first step, the fertilizer granules are partially coated by a first polymer film. Thereafter a second polymer film is applied onto the remaining uncoated fertilizer granule surface thereby encapsulating the fertilizer between the two polymer films.

According to one embodiment herein, an apparatus for coating plurality of articles in a continuous process using polymer melt comprises a first chill roll, a second identical chill roll, a first machine, a second machine, a feeding mechanism and a collection mechanism. The first chill roll comprises a plurality of cavities placed side by side and on the periphery of the first chill roll. The cavities are capable of holding the articles. The second identical chill roll comprises plurality of cavities placed side by side and on the periphery of second chill roll and the cavities of first and second chill rolls are facing each other. The first machine is used for producing a molten film of desired thickness, width and properties. The first polymer film is placed in such a way that the molten polymer film is applied directly onto the articles held in the cavity of the first chill roll. The second machine is adapted for producing a molten film of desired thickness, width and property. The second machine is placed in such a way that the molten film is applied directly onto the articles held in the cavity of the second chill roll. The feeding mechanism is for feeding the articles onto the first chill roll. The collection mechanism is for collecting coated articles from the second chill roll.

According to one embodiment herein, the chill roll is a cylindrical drum capable of rotating. The chill roll has a plurality of cavities on the circumferential surface of the roll. The chill roll has an internal fluid circulation to control a surface temperature of the chill roll. The chill roll has a non stick coating applied on the surface of the roll. The chill roll rotates in a synchronized way so that cavities on the surface of the first chill roll always face the identical cavities on the second chill roll.

The cavity of the chill roll is of any shape and dimension. The cavity of the chill roll is suitable for holding the articles being coated. The shape of the cavity is chosen from a tablet, spike, circular, rectangular, square or hexagonal shape. The cavities are distributed all over the circumference of the first and second chill roll. Further the cavities are of larger dimension than that of the articles being coated. The cavities have soft rubber or rubber like compressable cushion rings in the bottom. The cavity has an opening/hole in the bottom through which a vacuum suction is provided to hold the articles. Further the articles are housed in the cavity and held with the vacuum suction in the cavity. Only one article is housed per cavity.

According to one embodiment herein, the first and second machine used for producing a molten film comprises a polymer extruder and a film die. The polymer extruder is capable of mixing, melting and extruding any commercially available polymer or blend of polymers or additives and creating a homogenous melt. The polymer film die is capable of producing a molten film of desired thickness width and properties from the polymer film melt produced by the extruder. The die is attached to the end of the extruder.

According to one embodiment herein, the film die is a curtain coating die or slot die capable of producing a polymer film using polymer melt. The film die has a single layer or multilayer polymer film extrusion capability. The film die is a commercially available extrusion die capable of producing a molten polymer film of desired thickness, and width.

According to one embodiment herein, the method for coating the fertilizers is initiated by feeding the articles on the first chill roll where the articles are held in the cavities by the vacuum suction at the bottom of the cavity. The next step is extruding a first layer of molten polymer film on the articles. The pull of vacuum suction under the said articles pulls the molten polymer layer around the articles to adhere the molten film to the surface of the article to create a partially coated article. Further the partially coated articles are transferred to the cavity of the second chill roll and the uncoated portion of the partially coated particles is exposed. A second layer of molten polymer is extruded and applied on the uncoated portion of the partially coated articles in such a way that second coating layer overlaps the first coating layer and the high temperature of the molten second layer helps in laminating the second layer with the overlapping area of the first layer. Hence the fertilizer particle or an article is sealed or encapsulated between the first polymer layer and second polymer layer.

According to one embodiment herein, the articles are any commercially available fertilizer granule in any dimension and shape. Further the articles is any one selected from a group consisting of a detergent tablet of any shape and dimension, a biocide tablet of any shape and dimension, a pesticide granule of any shape and dimension, an animal feed of any shape and dimension, and a food particle of any shape and dimension. The articles have even or uneven shape. The articles chosen are water soluble.

According to one embodiment herein, the first and second polymer film is any extrusion grade polymer capable of producing a film of desired thickness and properties. The molten polymer film withstands a temperature range of 50° C.-500° C. The thickness of the polymer film is in the range of 5-300 micron. Further, the desired chemical property of the first polymer film and the second polymer film is water vapor transmission rate (WVTR). The WVTR value of the first polymer film and the second polymer film is within a range of 0.01 g/(m$^2$·day) to 20,000 g/(m$^2$·day).

According to one embodiment herein, the partially coated articles have the polymer coat covering in the range of 1%-99% of the surface area. Further the second polymer film coating on the partially coated articles have polymer coat covering in the range of 1%-99% of the surface area, of the coated article.

According to one embodiment herein, a method of producing the controlled release delivery systems comprises coating a first layer of polymer onto the surface of the article creating partially coated articles. The remaining uncoated portion of the surface area is exposed and applied with a second coating layer. The article is sealed between the first coating layer and the second coating layer by melt fusing the second coating layer with the first coating layer in the overlapping area of the first coating layer and the second coating layer. The article is encapsulated between the first coating layer and the second coating layer. The encapsulated article between the first coating layer and second coating layer is releasable over the time by diffusion through the first coating layer or the second polymer film.

According to one embodiment herein, the first polymer film and second polymer film have multiple film layers forming a single laminated coating layer. The first or second polymer films have additives into the film structure. The additives are selected from the group consisting of hydrophilic additives, surfactants, inorganic minerals, biodegradable additives and pigments. The hydrophilic additives or surfactants are added for increasing the moisture permeability of the coating layer. Inorganic minerals such as talc, calcium carbonate, mica or silica or their derivatives are added for modifying moisture permeability, reducing a temperature induced expansion of the polymer coating, and reducing a caking or agglomeration of the coated articles. The biodegradation additives are added for expediting the biodegradation of the coating layer. The pigments are added for providing a color to the coating films. The amount of additives added to the polymer layer is within a range of 0.01%-50% of the combined dry weight of the first or second coating layer.

According to one embodiment herein, the first or second polymer film has multiple film layers co-extruded to form a single coating layer. Further the multilayer coated films are of different thickness or different additives or have additive loading levels.

According to one embodiment herein, cheap polymers are used to coat the fertilizer granules. Further the dry fertilizer granules in any shape, form are coated, thereby eliminating the need for using expensive spherical fertilizer granules. The method of coating the fertilizer granules does not involve any solvent or catalyst. The method gives a uniform coating on the fertilizer granules. Furthermore the method allows an application of multiple polymers simultaneously thereby allowing the manufacturer to produce a fertilizer coated with multiple polymer layers. The method has ability to apply a coating film with desired weight in a single time thereby saving time, space and energy to produce coated products.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION OF DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

According to an embodiment herein, the fertilizer pellets are coated in two steps. In the first step, the first surface area of the fertilizer pellets is coated by a continuous first coating layer, this creates a partially coated pellet having one surface coated with a continuous first coating layer. Thereafter a second continuous coating layer is applied onto the remaining uncoated surface of the fertilizer granule to coat the remaining uncoated surface area of the pellet. The application of the second coating layer coats the second surface in a continuous coating layer. A part of the second coating layer binds with a part of the first coating layer over the surface of the fertilizer pellet and creates a composite overlap layer. The composite overlap layer is distinct from the first coating layer and the second coating layer, and is visible as a distinct layer when viewed through a microscope. The encapsulated fertilizer between the first coating layer, the second coating layer, and the composite overlap layer is releasable over a time period or interval by diffusion through the first coating layer, the second coating layer, and the overlap layer.

Figure 8:
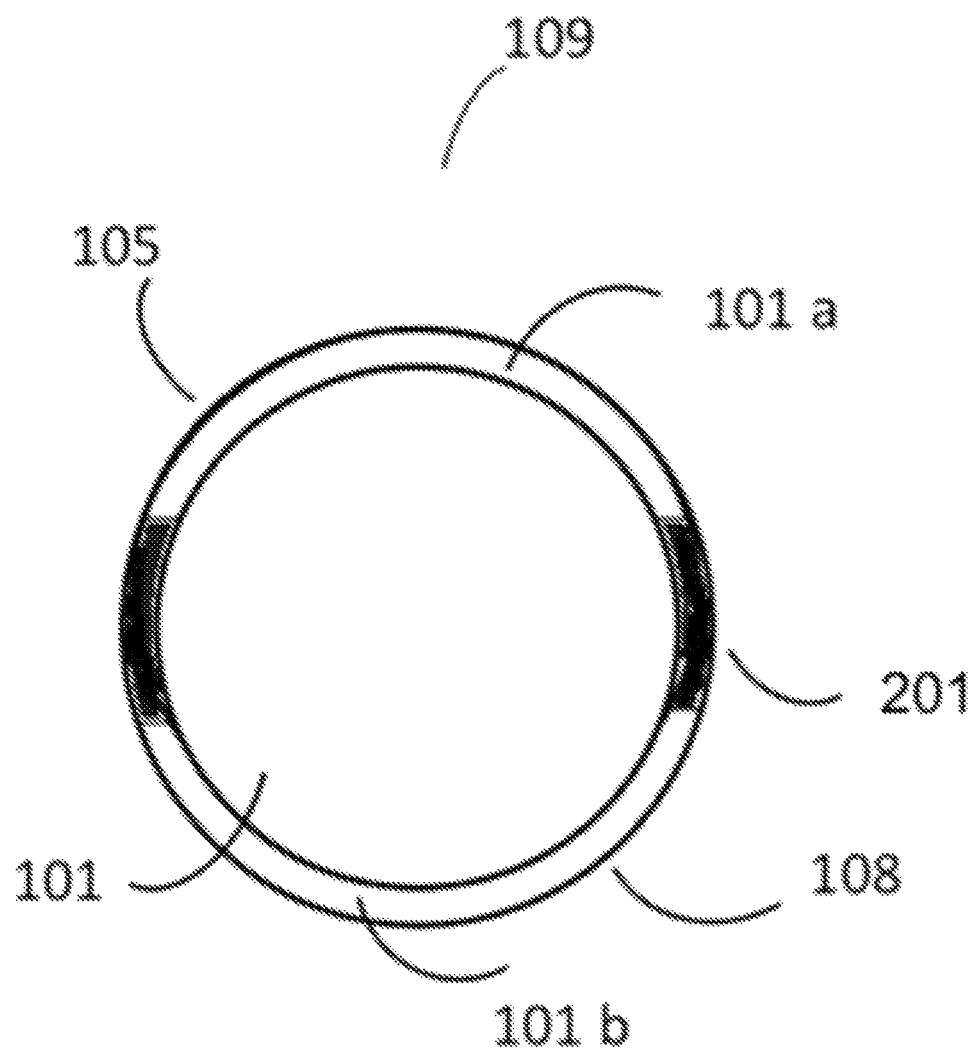
FIG. 8 illustrates a schematic view of a polymer coated fertilizer pellet encapsulated between a first coating layer 105, a second coating layer 108, and an overlap layer 201 obtained after the application of the second coating layer for manufacturing the polymer coated fertilizers, according to an embodiment herein. As presented in FIG. 8, first coating layer 105, the second coating layer 108, and the overlap layer 201 cover different parts of the surface of the fertilizer pellet 101.

According to an embodiment herein, presented in FIG. 8, a fertilizer pellet 101 is encapsulated in a three part continuous coated layer; a first coating layer 105 covers a first surface area of the fertilizer pellet 101, a second coating layer 108 covers a second surface area of the fertilizer pellet 101, a third coating layer 201 covers a third surface area of the fertilizer pellet 101, the third coating layer is an overlap layer formed by bonding a part of first coating layer with a part of the second coating layer on the surface of the fertilizer pellet 101, fertilizer encapsulated between the first coating layer, the second coating layer, and the third coating layer is releasable through any or all of the said three coating layers.

Figure 7:
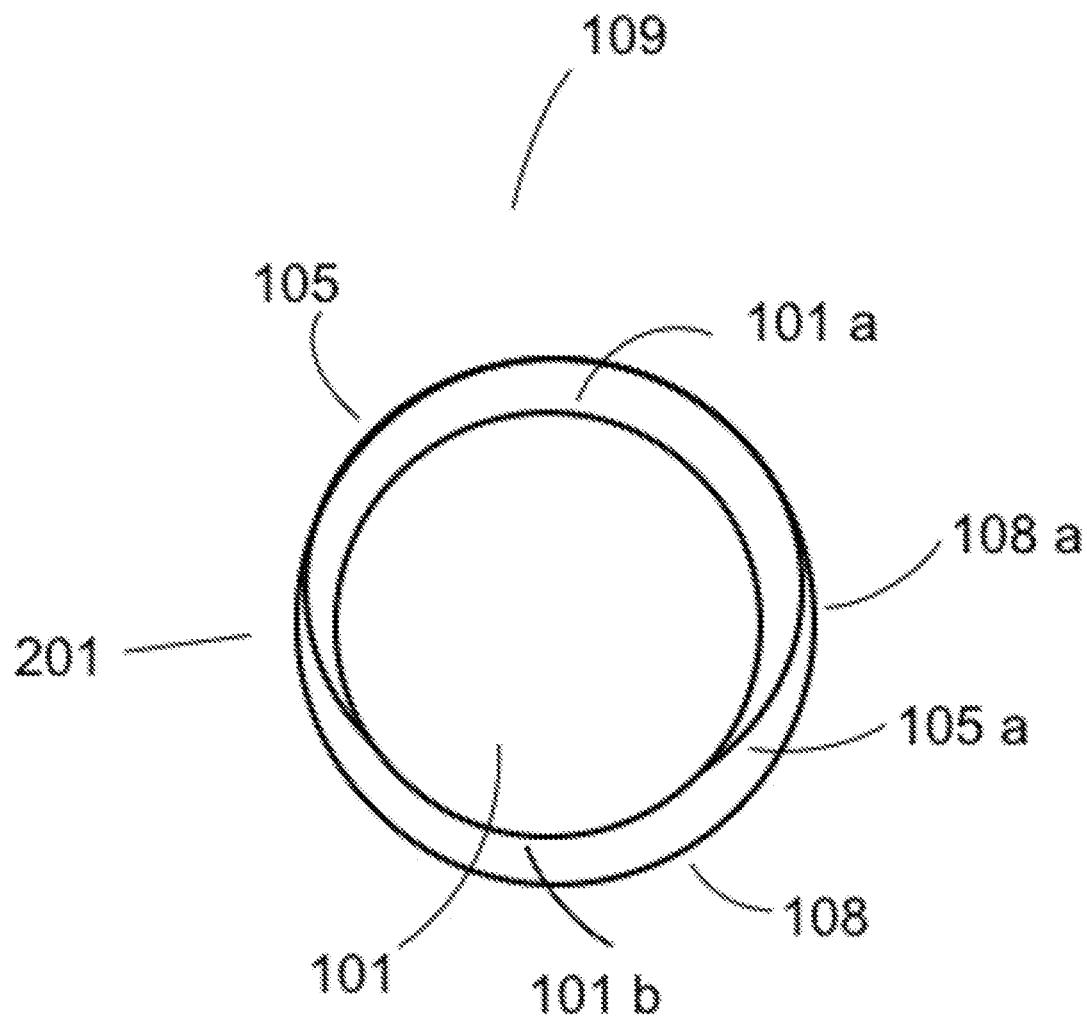
FIG. 7 illustrates a schematic view of the completely coated fertilizer pellet 109 having first continuous coating layer 105, second continuous coating layer 108, and an overlap layer 201, obtained after the application of the second coating layer for manufacturing the polymer coated fertilizers, according to an embodiment herein. The overlap layer 201 is formed by bonding the edge 105a of the first coating layer 105 with edge 108a of the second coating layer 108 onto the surface of the fertilizer pellet 101.

According to an embodiment herein, presented in FIG. 7; a polymer coated fertilizer pellet 109. A first coating layer 105 having a continuous structure and an edge 105a. The edge 105a is the narrow strip of layer at the end of the coating layer 105. The continuous structure of the first coating layer covers a first surface of the fertilizer pellet 101. A second coating layer 108 has a continuous structure and an edge 108a. The edge 108a is the narrow strip of layer at the end of the coating layer 108. The continuous structure of the second coating layer covers a second surface of the fertilizer pellet. The edge 105a of the first coating layer 105 and the edge 108a of the second coating layer 108 join together to form a distinct composite overlap layer 201. The Composite overlap layer covers a third surface of the fertilizer pellet 101. Polymer coated fertilizer pellet 109 is encapsulated in the first coating layer 105 covering a first surface, the second coating layer 108 covering a second surface, and the overlap layer 201 covering a third surface. The fertilizer encapsulated in the first coating layer, the second coating layer, and the overlap layer is releasable through the first coating layer, the second coating layer, or the overlap layer.

FIG. 7 and FIG. 8; Overlap layer formed by binding the edge 105a of the first coating layer 105 with the edge 108a of the second coating layer 108 is a composite overlap layer 201. Since overlap layer 201 it is made by joining two polymer structures the properties of the overlap layer 201 such as chemical, physical, properties, or mechanical properties would be distinct from the first coating layer 105 and the second coating layer 108 due to either change in thickness, change in polymer chain rearrangement, change in crystalline structure, or air bubbles getting trapped at the interface of edge 105a and edge 108a. The interface is the surface where the edge 105a of the first coating layer 105 joins with the edge 108a of the second coating layer 108.

FIG. 7, FIG. 8: According to an embodiment herein, Polymer coated fertilizer pellet 109 is encapsulated in a first coating layer 105 covering a first surface of the fertilizer pellet 101, a second coating layer 108 covering a second surface of the fertilizer pellet, and an overlap layer 201 covering a third surface of the fertilizer pellet, the fertilizer encapsulated in the first coating layer, the second coating layer, and the overlap layer is releasable through the first coating layer, the second coating layer, or the overlap layer. Wherein the first coating layer, the second coating layer, and the overlap layer are distinct from each other.

According to an embodiment herein, As presented in FIG. 8, Polymer coated fertilizer pellet 109 comprises three layers; a first coating layer 105 having thickness between 5 microns to 300 microns and water vapor transmission rate (WVTR) between 1 g/(m²·day) to 2000 g/(m²·day), a second coating layer 108 having thickness between 5 microns to 300 microns and water vapor transmission rate (WVTR) between 1 g/(m²·day) to 2000 g/(m²·day), and a composite overlap layer 201 having thickness between 5 microns to 300 microns and water vapor transmission rate (WVTR) between 1 g/(m²·day) to 2000 g/(m²·day). The first coating layer covers a first surface of the fertilizer pellet 101, second coating layer 108 covers a second surface of the fertilizer pellet 101, and the composite overlap layer covers a third surface of the fertilizer pellet 101. The fertilizer pellet 101 in polymer coated fertilizer 109 is releasable through the first coating layer 105, the second coating layer 108, and the composite overlap layer 201.

According to an embodiment herein FIG. 7 and FIG. 8, a continuous coating layer encapsulating the fertilizer pellet 101 comprises; three separate but continuous structures; 1) first coating layer 105, 2) the second layer 108, and 3) the overlap layer 201. The three layers (105, 108, and 201) are a part of continuous structure where the first layer 105 is separated by a strip of overlap layer 201 such that the first coating layer 105 is on one side and the second coating layer 108 is on the other side of the overlap layer 201.

Figure 6:
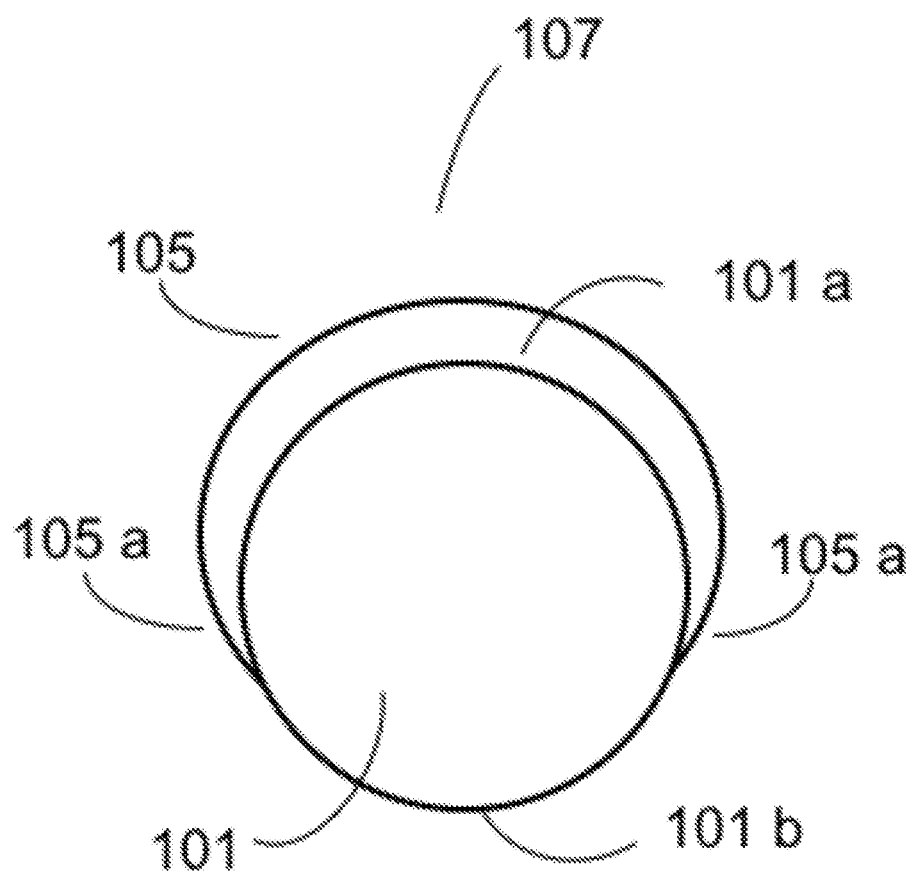
FIG. 6 illustrates a schematic view of a partially coated fertilizer pellet 107 having a continuous coating layer 105 covering a first surface area 101a of the fertilizer pellet 101 obtained after the application of the first coating layer 105 for manufacturing the polymer coated fertilizers, according to an embodiment herein. First coating layer 105 has a continuous structure and an edge 105a, wherein the edge 105a is a narrow strip at the end of first coating layer structure.

As shown in FIG. 6, FIG. 7, and FIG. 8, first surface 101a and the second surface 101b are the opposite surfaces of the fertilizer pellet 101.

According to an embodiment herein, as presented in FIG. 7 and FIG. 8 Fertilizer pellet 101 having its first surface 101a coated with a first polymer film 105 and second surface 101b coated with a second polymer film 108 and sealing the first polymer film 105 and the second polymer film 108 onto the surface of the fertilizer pellet 101 by melt fusing a part 105a of first polymer film 105 with a part 108a of the second polymer film 108 creating an overlap layer 201 such that the first polymer film 105 and the second polymer film 108 are on the opposite side separated by the overlap layer 201, the distinct sealing layer 201 runs along the circumference of the fertilizer pellet 101 dividing the first polymer film 105 and the second polymer film 108, the coated fertilizer 109 produced herein is a controlled-release fertilizer.

According to an embodiment herein, a method of manufacturing polymer coated fertilizer pellet 109 comprises; applying a first coating layer 105 onto a first surface 101a of fertilizer pellet 101 creating a partially coated fertilizer 107 (FIG. 6), wherein first coating layer having a continuous structure 105 and an edge 105a, thereafter a second coating layer 108 is applied onto the partially coated fertilizer, the second coating layer 108 covers a second surface area of the fertilizer pellet 101, the second coating layer 108 covers the second surface of the fertilizer pellet in a continuous coating layer and an overlap layer 201, the overlap layer 201 is formed by sealing an edge 105a of the first coating layer 105 with an edge 108a of the second coating layer 108 onto the surface of the fertilizer pellet 101, the overlap layer 201 seals the edge 105a of the first coating layer 105 and the edge 108a of the second coating layer 108 onto the surface of the fertilizer pellet 101 so that the fertilizer pellet 101 is completely encapsulated between the first coating layer 105 and the second coating layer 108, and the overlap layer 201 is releasable through the first coating layer 105, the second coating layer 108, or the overlap layer 201 in a controlled-release manner.

According to an embodiment herein, as presented in FIG. 8, the overlap layer 201 has a different thickness than the first coating layer 105 and the second coating layer 108, the fertilizer pellet 101 encapsulated between the first coating layer 105, the second coating layer 107, and the overlap layer is releasable through the first coating layer 105, the second coating layer 108, and the overlap layer 201.

As presented in FIG. 8, the first coating layer 105 covers first surface of fertilizer pellet, the second coating layer 108 covers second surface of fertilizer pellet, and the overlap layer 201 covers third surface of the fertilizer pellet. The third surface of the fertilizer pellet is between the first surface and the second surface.

In all embodiments the polymer coated fertilizer pellet 109 will have three coating layers that are visible under the microscope or to the naked eye; the first coating layer 105, the second coating layer 108, and the composite overlap layer 201 (As presented in FIG. 8). First coating layer 105 and the second coating layer 108 may be same or different but the overlap layer 201 is always distinct in all the embodiments due to the binding of two polymer structure. Fertilizer pellet 101 is releasable through the first coating layer 105, the second coating layer 108, and the overlap layer 201.

The overlap layer 201 encircle the fertilizer pellet 101 like a strip of layer and is distinct from the first coating layer 105 and second coating layer 108 (as shown in FIG. 8), the overlap layer 201 has different physical, structural, or chemical properties than the first coating layer 105 and the second coating layer 108

According to an embodiment herein, under the vacuum pull the edge 105a of the first coating layer and the edge 108a of the second coating layer stretch and the stretching induces orientation in the edge layer. Orientation induced changes cause the property of edge layer to change from the rest of the coating layer.

According to an embodiment herein, First Coating layer 105 may have a thickness between 5 microns to 300 microns, preferably between 10 micron to 100 microns, most preferably 10 micron to 50 microns. The fertilizer pellet 101 may be a fertilizer tablet, wherein the diameter of the tablet is between 8 mm to 12 mm and thickness of the tablet is between 4 mm to 8 mm.

According to an embodiment herein, As shown in FIG. 7 the overlap layer 201 covers the surface of the fertilizer pellet 101 between the end point of the edge 105a and end point of the edge 108a. The overlap layer 201 is a strip of composite layer that runs along the circumference of the fertilizer pellet 101 (As shown in FIG. 8).

According to an embodiment herein; A polymer coated fertilizer for use in agriculture production comprising; a solid pellet of material that includes a fertilizer, the solid pellet of material having a surface; a first coating layer having a continuous structure covering a first surface of the pellet; a second coating layer having a continuous structure covering a second surface of the pellet; whereas the second coating layer covers the surface not covered by the first coating layer; a composite overlap layer covering a third surface of the pellet, wherein the composite overlap layer is formed by bonding a part of the first coating layer with a part of the second coating layer to encapsulate the pellet between the first coating layer, the second coating layer, and the composite overlap layer, wherein the composite layer is distinct from the first coating layer and the second coating layer; and fertilizer pellet encapsulated between the first coating layer, the second coating layer, and the composite overlap layer is releasable through the first coating layer, the second coating layer, and the composite overlap layer over a period of time.

According to an embodiment herein, the fertilizer includes at least one of the following: an organic fertilizer, an inorganic fertilizer, a natural fertilizer, a synthetic fertilizer, a micronutrient, an insecticide, a fungicide, a herbicide, a nitrification inhibitor, a bioinoculant, a urease inhibitor, an aluminium sulfate.

According to an embodiment herein, wherein the solid pellet of material includes one of the following: a tablet, a capsule, a briquette, and a granule.

According to an embodiment herein, wherein the first coating layer includes at least one of the following: a natural polymer, a synthetic polymer, a biodegradable polymer, a non-biodegradable polymer, a processing additive, a polymer stabilizing additive, an inorganic mineral, a biodegradation additive, a oxo-biodegradation additive, a nitrification inhibitor, a urease inhibitor, a hydrogel particle, an organic surfactant, an inorganic surfactant, a pigment, a chemical taggant, a physical taggant, and a pesticide.

According to an embodiment herein, wherein the second coating layer includes at least one of the following: a natural polymer, a synthetic polymer, a biodegradable polymer, a non-biodegradable polymer, a polymer processing additive, a polymer stabilizing additive, an inorganic mineral, a biodegradation additive, a oxo-biodegradation additive, a nitrification inhibitor, a urease inhibitor, a hydrogel particle, an organic surfactant, an inorganic surfactant, a pigment, a chemical taggant, a physical taggant, and a pesticide.

The polymer-coated article of claim 1 wherein fertilizer pellet is a urea tablet having weight between 100 mg to 800 mg.

A polymer coated fertilizer comprising; a solid pellet of material that includes a fertilizer, the solid pellet of material having a surface, a first coating layer having a continuous structure and an edge, wherein the continuous structure of the first coating layer covers a first surface area of the fertilizer pellet, a second coating layer having a continuous structure and an edge, wherein the continuous structure of the second coating layer covers a second surface area of the fertilizer pellet, wherein the first surface area is not same as the second surface area, an overlap layer, wherein the overlap layer covers a third surface area of the fertilizer pellet, wherein the third surface area is different from the first surface area and the second surface area, wherein the overlap layer is formed by laminating the edge of the second coating layer with the edge of the first coating layer, wherein the overlap layer is distinct from the first coating layer and the second coating layer; and the fertilizer pellet encapsulated in the first continuous coating layer, the second continuous coating layer, and the overlap layer is releasable through the first coating layer, the second coating layer, and the overlap layer over a period of time.

According to an embodiment herein, wherein the fertilizer includes any commercially available fertilizer for use in agriculture crops production.

According to an embodiment herein, wherein the first coating layer includes any commercially available polymer film that can be thermoformed.

According to an embodiment herein, wherein the second coating layer includes any commercially available polymer film that can be thermoformed.

A Polymer coated fertilizer comprising; a solid pellet of material that includes a fertilizer, the solid pellet of material having a surface, a first coating layer covering a first surface of the fertilizer pellet, a second coating layer covering a second surface of the fertilizer pellet, a third coating layer covering a third surface of the fertilizer pellet; wherein the second coating layer covers a surface not covered by the first coating layer, and wherein the third coating layer covers a surface not covered by the second coating layer; wherein the third coating layer is visible as distinct from the first coating layer and the second coating layer when viewed under a microscope, and fertilizer encapsulated between the first coating layer, the second coating layer, and the third coating layer is releasable through the first coating layer, the second coating layer, and the third coating layer over a period of time.

According to a preferred embodiment herein, a steps of manufacturing polymer coated fertilizer comprising; placing plurality of fertilizer pellets 101 into a plurality of housing cavity, wherein the plurality of housing cavities are at a fixed distance from each other and house at least one fertilizer pellet per cavity, applying a first continuous coating layer 105 onto the first surface 101a of the fertilizer pellet 101, a vacuum pull is applied underneath the fertilizer pellet 101 through an opening in the housing cavity, the vacuum suction pulls the first coating layer 105 around the fertilizer pellet 101 coating the first surface 101a with the first coating layer 105 creating a partially coated fertilizer pellet 107 (FIG. 6) having a continuous coating layer 105 and an edge 105a covering the first surface 101a of the fertilizer pellet 101, thereafter the partially coated fertilizer pellets 107 are turned over to expose the uncoated surface of the partially coated fertilizer pellets. Thereafter, a second continuous coating layer 108 is applied onto the partially coated fertilizer pellets 107, the second coating layer 108 is applied to coat the second surface 101b of the fertilizer pellets 101, the second coating layer 108 coats the second surface of the partially coated fertilizer pellets, and the edge 108a of the second coating layer 108 goes over the edge 105a of the first coating layer 105 and melt fuses to create an overlap layer 201, wherein the overlap layer comprises a part 105a of the first coating layer 105 and a part 108a of the second coating layer 108a, bonded together to form a distinct layer, the edge of the second coating layer 108a forms the top portion of the overlap layer 201 and the edge 105a of the first coating layer 105 forms the bottom part of the overlap layer 201 (FIG. 7), the overlap layer runs along the circumference of the fertilizer pellet 101 encircling the fertilizer pellet, the overlap layer 201 appears as a distinct layer either through the naked eye or when viewed under the microscope, and separates the first coating layer 105 and the second coating layer 108 on the surface of the fertilizer pellet 101, the fertilizer pellet encapsulated between the first coating layer, the second coating layer, and the overlap layer is releasable through the first coating layer, the second coating layer, or the overlap layer.

According to an embodiment herein, As shown in FIG. 6, a partially coated solid pellet 107 comprising; a solid pellet 101, a coating layer 105 having a continuous structure and an edge 105a; wherein the coating layer 105 covers a first surface area 101a of the solid article 101 in a continuous layer; and a second surface area 101b of the solid article 101 is the uncoated surface area of the fertilizer pellet 101;

According to an embodiment therein, A partially coated pellet having a part 101a of the surface area coated with a continuous coating layer 105, wherein the coated surface area 101a is less than 95% of the total surface area of the fertilizer pellet 101, a part of the surface area 101b of the solid pellet remains uncoated. The coating layer may be selected from a group of commercially available thermoplastic polymers or blends prepared from the commercially available thermoplastic polymers such as water-soluble polymers, water insoluble polymers, biopolymers, natural polymers, biodegradable polymers, and synthetic polymers, The first continuous coating layer 105 and the second continuous layer 108 may be same or different in terms of compositions, thickness, or any other chemical property, whereas the overlap layer 201 is distinct from the first continuous coating layer and the second continuous coating layer.

According to an embodiment herein, the first coating layer 105 covers 10% to 90% of the total surface area of the fertilizer pellet 101

According to an embodiment herein, the second coating layer 108 covers 10% to 90% of the total surface area of the fertilizer pellet 101

According to an embodiment herein, the fertilizer pellets are applied with biologicals and thereafter coated with first and the second coating layer to encapsulate the biologicals in the coating layers, wherein the first and the second coating layers are made of low temperature melting polymers.

According to an embodiment herein, the first coating layer 105, and the second coating layer 108 may comprise; Polymers, plasticizers, micronutrients, fertilizers, fungicides, insecticides, herbicides, bio-acids, biologicals, or any plant growth promoter, According to an embodiment herein, the overlap layer 201 may comprise an adhesive layer to help form a pinhole free overlap layer 201, the adhesive layer may be applied onto the edge 105a and the said adhesive binds the edge 105a with the edge 108a under heat or by curing.

According to an embodiment herein, a polymer coated urea tablet for use in agriculture production comprising; a urea fertilizer tablet, wherein the weight of urea tablet is between 200 to 800 milligrams, a first continuous film covering a first surface of the said urea tablet, a second continuous film covering a second surface of the said urea tablet, and an overlap layer formed by heat sealing the edge of the first continuous film with the edge of the second continuous film, the overlap layer formed is distinct from the first continuous film and the second continuous film, the overlap layer is visible as a distinct layer when viewed through a microscope, wherein the overlap has different physical or chemical properties than either the first or the second continuous film; wherein the first continuous film and the second continuous film may be made of the same polymer composition, wherein the overlap layer has different physical and chemical properties than the first continuous film and the second continuous film. The diameter of the urea tablet is between 6 to 10 millimetres and thickness is between 4 to 8 millimetres.

According to an embodiment herein, a system for coating a plurality of articles in a continuous process using a polymer melt is provided. The system comprises a feeding mechanism connected to a first chill roll to supply a plurality of articles. The first chill roll comprises a plurality of first cavities on a peripheral surface and the plurality of first cavities houses and holds a plurality of articles. A first machine is provided for producing a first molten film and applying the first molten film on the plurality of articles held in the plurality of first cavities in the first chill roll to partially coat the plurality of articles with the first molten film. A second chill roll is placed at a side of the first chill roll or the second chill roll is placed on a bottom side of the first chill roll to receive a plurality of articles partially coated with a first molten film. A second machine is provided for producing and applying the second molten film on the plurality of articles held in the plurality of second cavities in the second chill roll and partially coated with the first molten film. A collector mechanism is provided to receive the plurality of articles coated with the first molten film and the second molten film from the second chill roll.

According to an embodiment herein, a system for coating a plurality of articles in a continuous process using a polymer melt is provided. The system comprises a first chill roll, a second chill roll, a first machine, a second machine, a feeding mechanism and a collector mechanism.

According to an embodiment herein, the first chill roll comprises a plurality of first cavities on a peripheral surface and the plurality of first cavities houses and holds a plurality of articles.

According to an embodiment herein, the second chill roll is identical to the first chill roll. The second chill roll is placed at a side of the first chill roll or the second chill roll is placed on a bottom side of the first chill roll. The second chill roll comprises a plurality of second cavities on a peripheral surface. The plurality of second cavities houses and holds a plurality of articles received from the first chill roll. The plurality of second cavities in the second chill roll matches with the plurality of first cavities in the first chill roll. The plurality of second cavities in the second chill roll and the plurality of first cavities in the first chill roll are arranged to face each other.

According to an embodiment herein, the system comprises a first machine for producing a first molten film and applying the first molten film on the plurality of articles held in the plurality of first cavities in the first chill roll to partially coat the plurality of articles with the first molten film. The first molten film has a desired thickness, width and chemical properties. The first machine comprises a first polymer extruder and a first film molding die. The first polymer extruder mixes, melts and extrudes a polymer to generate a homogenous melt of polymer. The first film molding die is attached to an end of the first polymer extruder for receiving a molten feed from the first polymer extruder to produce the first molten film of desired thickness and width. The polymer is a single polymer or a blend of polymers.

According to an embodiment herein, the system comprises a second machine for producing a second molten film and applying the second molten film on the plurality of articles held in the plurality of second cavities in the second chill roll. The second molten film has a desired thickness, width and chemical properties. The second machine comprises a second polymer extruder and a second film molding die. The second polymer extruder mixes, melts and extrudes a polymer to generate a homogenous melt of polymer. The second film molding die is attached to an end of the polymer extruder for receiving a molten feed from the second polymer extruder to produce the second molten film of desired thickness and width. The polymer is a single polymer or a blend of polymers.

According to an embodiment herein, the system comprises a feeding mechanism for feeding the plurality of articles to the first chill roll and a collection mechanism for collecting the plurality of articles from the second chill roll. The plurality of articles collected from the second chill roll are coated with the first polymer film at one side of the plurality of articles and with the second polymer film at an opposite side of the plurality of articles so that the plurality of articles are encapsulated within the first polymer film and the second polymer film. The plurality of articles is a controlled release article.

According to an embodiment herein, the plurality of articles is selected from a group consisting of a fertilizer, a pharmaceutical tablet, a detergent tablet, a biocide tablet, a pesticide granule, an animal feed and a food particle. The plurality of articles is water soluble.

According to an embodiment herein, the plurality of articles is selected from a group consisting of a polymer coated articles.

According to an embodiment herein, the mean article size is within the range of 1 mm to 150 mm.

According to an embodiment herein, the system further comprises a cutting mechanism provided at the first chill roll and the second chill roll to cut the first polymer film and the second polymer film after application on the plurality of articles. The cutting mechanism is a sharp cutting edge provided on the surface of the first chill roll and the second chill roll.

According to an embodiment herein, the system further comprises a rotary pin to push the plurality of articles held at the plurality of second cavities in the second chill roll, when the second polymer film is applied on the plurality of the articles coated partially with the first polymer film.

According to an embodiment herein, the first chill roll is rotated in a clockwise direction through a desired angle for receiving the plurality of articles at the plurality of first cavities. The second chill roll is rotated in an anti-clockwise direction through a desired angle for receiving the plurality of articles at the plurality of cavities. The first chill roll and the second chill roll are rotated in a synchronized manner in the clockwise direction and in the anti-clockwise direction respectively so that at least one of the plurality of first cavities in the first chill roll is arranged opposite to at least one of the plurality of second cavities in the second chill roll to transfer the plurality of articles in the first cavities of the first chill roll to the plurality of second cavities in the second chill roll.

According to an embodiment herein, the first chill roll and the second chill roll comprise an internal fluid circulation mechanism for circulating a fluid to control a surface temperature of the first chill roll. The first chill roll and the second chill roll comprise a non-stick coating on an outer surface to avoid a sticking of the molten film. The first chill roll and the second chill roll are rotatable cylindrical drums.

According to an embodiment herein, each of the plurality of first cavities and each of the plurality of second cavities hold one article. The plurality of first cavities and the pluralities of the second cavities are arranged in a shape selected from a group consisting of a tablet, spike, circular, rectangular, square and hexagonal shapes. Each one of the plurality of first cavities and each one of the plurality of second cavities holds at-least one article by a vacuum. The plurality of first cavities and the plurality of second cavities comprise an opening or hole in a bottom to provide the vacuum for holding the plurality of articles. A size of the plurality of first cavities is larger than a size of the plurality of articles and a size of the plurality of second cavities is larger than a size of the plurality of articles. The plurality of first cavities and the plurality of second cavities comprise a compressable cushion ring in a bottom. The compressible cushion ring is made up of a material selected from a group consisting of a soft rubber material or a rubber like material.

According to an embodiment herein, the first polymer film die and the second polymer film die is any one of a curtain coating and a slot dye. The first polymer film die and the second polymer film die produce a single layer polymer film or a multilayer polymer film.

According to an embodiment herein, the polymer is melt processed into a molten film of desired thickness.

According to an embodiment herein, the first polymer film is coated on the surface of the plurality of articles in a range of 1%-99%. The second polymer film is coated on the surface of the plurality of articles coated partially with the first polymer film in a range of 1%-99%.

According to an embodiment herein, the first polymer film and the second polymer film comprise one or more additives. The one or more additives are selected from a group consisting of synthetic or natural hydrophilic additives, surfactants, inorganic minerals, biodegradable additives, pigments and water soluble additive. The hydrophilic additives and surfactants are added for increasing a moisture permeability of the first polymer film and the second polymer film.

According to an embodiment herein, the inorganic mineral is selected from a group consisting of talc, calcium carbonate, mica, silica and their derivatives. The inorganic minerals are added for modifying a moisture permeability, reducing a temperature induced expansion of the first polymer film and the second polymer film, and reducing a tackiness of the first polymer film and the second polymer film, and preventing a caking or agglomeration of the plurality of articles coated with the first polymer film and the second polymer film.

According to an embodiment herein, wherein the biodegradable additives are added for adding a biodegradable characteristics to the first polymer film and the second polymer film and for expediting a biodegradation of the first polymer film and the second polymer film. The additives are added to the first polymer film and the second polymer film layer in a range of 0.01%-50% of a combined dry weight of the first polymer film and the second polymer film.

According to an embodiment herein, the desired thickness of the first polymer film and the second polymer film is within a range of 5 microns to 300 microns. The desired temperature of the first molten polymer film and the second molten polymer film is within a range of 50° C. to 500° C. The desired chemical property of the first polymer film and the second polymer film is water vapor transmission rate (WVTR). The WVTR value of the first polymer film and the second polymer film is within a range of 0.01 g/(m²·day) to 20,000 g/(m²·day).

According to an embodiment herein, a method is provided for coating a plurality of articles in a continuous process using a polymer. The method comprises extruding and applying a first coating layer with a first molten polymer film on a plurality of articles held on a plurality of first cavities in a first chill roll for generating a plurality of articles coated partially with the first polymer film. The plurality of articles coated partially with the first polymer film is transferred from the first chill roll to a second chill roll. An uncoated portion of the plurality of articles coated partially with the first polymer film is exposed. A second coating layer of a second molten polymer film is extruded and applied on the plurality of articles held on a plurality of second cavities in the second chill roll for generating a plurality of articles fully coated with the first polymer film and the second polymer film. The plurality of articles is encapsulated between the first coating layer and the second coating layer by sealing the first polymer film and the second polymer film coated on the plurality of articles by melt fusing the second polymer film with the first polymer film on an overlapping area of the first polymer film and the second polymer film. The encapsulated plurality of articles is released over a time period by a diffusion of the encapsulated plurality of articles through the first polymer film or the second polymer film.

According to an embodiment herein, the plurality of articles are held in the plurality of first cavities and in the plurality of second cavities by a vacuum suction adopted at a bottom of the plurality of first cavities and at the plurality of second cavities. A pulling force of the vacuum suction under the plurality of articles is adapted to pull the first polymer film and the second polymer film around the plurality of articles and to adhere the first polymer film and the second polymer film respectively to an opposing surface of the plurality of articles.

According to an embodiment herein, the first polymer film is coated on the surface of the plurality of articles in a range of 1%-99%. The second polymer film is coated on the surface of the plurality of articles coated partially with the first polymer film in a range of 1%-99%.

According to an embodiment herein, the polymer is melt processed into a molten film.

According to an embodiment herein, the first polymer film and the second polymer film comprises one or more additives. The one or more additives are selected from a group consisting of hydrophilic additives, surfactants, inorganic minerals, biodegradable additives, pigments and water soluble additive. The hydrophilic additives or surfactants are added for increasing a moisture permeability of the first polymer film and the second polymer film.

According to an embodiment herein, the inorganic mineral is selected from a group consisting of talc, calcium carbonate, mica, silica and their derivatives. The inorganic minerals are added for reducing a moisture permeability, reducing a temperature induced expansion of the first polymer film and the second polymer film, and reducing a tackiness of the first polymer film and the second polymer film to prevent a caking of the plurality of articles coated with the first polymer film and the second polymer film.

According to an embodiment herein, the biodegradable additives are added for adding a biodegradable characteristic to the first polymer film and the second polymer film and for expediting a biodegradation of the first polymer film and the second polymer film.

According to an embodiment herein, the additives are added to the first polymer film and the second polymer film layer in a range of 0.01%-50% of a combined dry weight of the first polymer film and the second polymer film.

According to an embodiment herein, the desired thickness of the first polymer film and the second polymer film is within a range of 5 microns to 300 microns. The desired temperature of the first polymer film and the second polymer film is within a range of 50° C. to 500° C. The desired chemical property of the first polymer film and the second polymer film is water vapor transmission rate (WVTR). The WVTR value of the first polymer film and the second polymer film is within a range of 0.01 g/(m²·day) to 20,000 g/(m²·day).

According to an embodiment herein, the first chill roll and the second chill roll are rotatable cylindrical drums.

According to an embodiment herein, a method for manufacturing a controlled release fertilizer involves placing the fertilizer granules onto a surface and applying a first layer of polymer onto the exposed surface of the fertilizer granule. Then the uncoated portion of fertilizer is exposed and a second layer of polymer is applied to encapsulate the fertilizer granule between the first polymer layer and the second polymer layer such that the fertilizer granules are releasable over a time by a diffusion through at least one of the first polymer film or the second polymer film.

According to one embodiment herein, the manufacturing process of polymer-coated fertilizers has two main steps. In the first step, the fertilizer granules are partially coated by a first polymer film. Thereafter a second polymer film is applied onto the remaining uncoated fertilizer granule surface thereby encapsulating the fertilizer between the two polymer films.

According to one embodiment herein, an apparatus for coating plurality of articles in a continuous process using polymer melt comprises a first chill roll, a second identical chill roll, a first machine, a second machine, a feeding mechanism and a collection mechanism. The first chill roll comprises a plurality of cavities placed side by side and on the periphery of the first chill roll. The cavities are capable of holding the articles. The second identical chill roll comprises plurality of cavities placed side by side and on the periphery of second chill roll and the cavities of first and second chill rolls are facing each other. The first machine is used for producing a molten film of desired thickness, width and properties. The first polymer film is placed in such a way that the molten polymer film is applied directly onto the articles held in the cavity of the first chill roll. The second machine is adapted for producing a molten film of desired thickness, width and property. The second machine is placed in such a way that the molten film is applied directly onto the articles held in the cavity of the second chill roll. The feeding mechanism is for feeding the articles onto the first chill roll. The collection mechanism is for collecting coated articles from the second chill roll.

According to one embodiment herein, the chill roll is a cylindrical drum capable of rotating. The chill roll has a plurality of cavities on the circumferential surface of the roll. The chill roll has an internal fluid circulation to control a surface temperature of the chill roll. The chill roll has a non stick coating applied on the surface of the roll. The chill roll rotates in a synchronized way so that cavities on the surface of the first chill roll always face the identical cavities on the second chill roll.

The cavity of the chill roll is of any shape and dimension. The cavity of the chill roll is suitable for holding the articles being coated. The shape of the cavity is chosen from a tablet, spike, circular, rectangular, square or hexagonal shape. The cavities are distributed all over the circumference of the first and second chill roll. Further the cavities are of larger dimension than that of the articles being coated. The cavities have soft rubber or rubber like compressable cushion rings in the bottom. The cavity has an opening/hole in the bottom through which a vacuum suction is provided to hold the articles. Further the articles are housed in the cavity and held with the vacuum suction in the cavity. Only one article is housed per cavity.

According to one embodiment herein, the first and second machine used for producing a molten film comprises a polymer extruder and a film die. The polymer extruder is capable of mixing, melting and extruding any commercially available polymer or blend of polymers or additives and creating a homogenous melt. The polymer film die is capable of producing a molten film of desired thickness width and properties from the polymer film melt produced by the extruder. The die is attached to the end of the extruder.

According to one embodiment herein, the film die is a curtain coating die or slot die capable of producing a polymer film using polymer melt. The film die has a single layer or multilayer polymer film extrusion capability. The film die is a commercially available extrusion die capable of producing a molten polymer film of desired thickness, width and properties.

According to one embodiment herein, the method for coating the fertilizers is initiated by feeding the articles on the first chill roll where the articles are held in the cavities by the vacuum suction at the bottom of the cavity. The next step is extruding a first layer of molten polymer film on the articles. The pull of vacuum suction under the said articles pulls the molten polymer layer around the articles to adhere the molten film to the surface of the article to create a partially coated article. Further the partially coated articles are transferred to the cavity of the second chill roll and the uncoated portion of the partially coated particles is exposed. A second layer of molten polymer is extruded and applied on the uncoated portion of the partially coated articles in such a way that second coating layer overlaps the first coating layer and the high temperature of the molten second layer helps in laminating the second layer with the overlapping area of the first layer. Hence the fertilizer particle or an article is sealed or encapsulated between the first polymer layer and second polymer layer.

According to one embodiment herein, the articles are any commercially available fertilizer granule in any dimension and shape. Further the articles is any one selected from a group consisting of a detergent tablet of any shape and dimension, a biocide tablet of any shape and dimension, a pesticide granule of any shape and dimension, an animal feed of any shape and dimension, and a food particle of any shape and dimension. The articles have even or uneven shape. The articles chosen are water soluble.

According to one embodiment herein, the first and second polymer film is any extrusion grade polymer, capable of producing a film of desired thickness and properties. The desired temperature of the first polymer film and the second polymer film is within a range of 50° C. to 500° C. Further the thickness of the polymer film is in the range of 5-300 micron. The desired chemical property of the first polymer film and the second polymer film is water vapor transmission rate (WVTR). The WVTR value of the first polymer film and the second polymer film is within a range of 0.01 g/(m²·day) to 20,000 g/(m²·day).

According to one embodiment herein, the partially coated articles have the polymer coat covering in the range of 1%-99% of the surface area. Further the second polymer film coating on the partially coated articles have polymer coat covering in the range of 1%-99% of the surface area, of the partially coated article.

According to one embodiment herein, a method of producing the controlled release delivery systems comprises coating a first layer of polymer onto the surface of the article creating partially coated articles. The remaining uncoated portion of the surface area is exposed and applied with a second coating layer. The article is sealed between the first coating layer and the second coating layer by melt fusing the second coating layer with the first coating layer in the overlapping area of the first coating layer and the second coating layer. The article is encapsulated between the first coating layer and the second coating layer. The encapsulated article between the first coating layer and second coating layer is releasable over the time by diffusion through the first coating layer or the second polymer film.

According to one embodiment herein, the first polymer film and second polymer film have multiple film layers forming a single laminated coating layer. The first or second polymer films have additives into the film structure. The additives are selected from the group consisting of hydrophilic additives, inorganic minerals, biodegradable additives and pigments. The hydrophilic additives are added for increasing the moisture permeability of the coating layer. Inorganic minerals such as talc, calcium carbonate, mica or silica or their derivatives are added for reducing moisture permeability, reducing a temperature induced expansion of the polymer coating and reducing a tackiness of the coating to prevent a caking of the coated articles. The biodegradation additives are added for expediting the biodegradation of the coating layer. The pigments are added for providing a color to the coating films. The amount of additives added to the polymer layer is within a range of 0.01%-50% of the combined dry weight of the first or second coating layer.

According to one embodiment herein, the first or second polymer film has multiple film layers laminated to form a single coating layer. Further the multilayer coated films are of different thickness or different additives or have additive loading levels.

According to one embodiment herein, cheap polymers are used to coat the fertilizer granules. Further the dry fertilizer granules in any shape, form are coated, thereby eliminating the energy cost of granulating the fertilizer. The method of coating the fertilizer granules does not involve any solvent or catalyst. The method gives a uniform coating on the fertilizer granules. Furthermore the method allows an application of multiple polymers simultaneously thereby allowing the manufacturer to produce a fertilizer coated with multiple polymer layers. The method has ability to apply a coating film with desired weight in a single time thereby saving time, space and energy to produce coated products.

Figure 1:
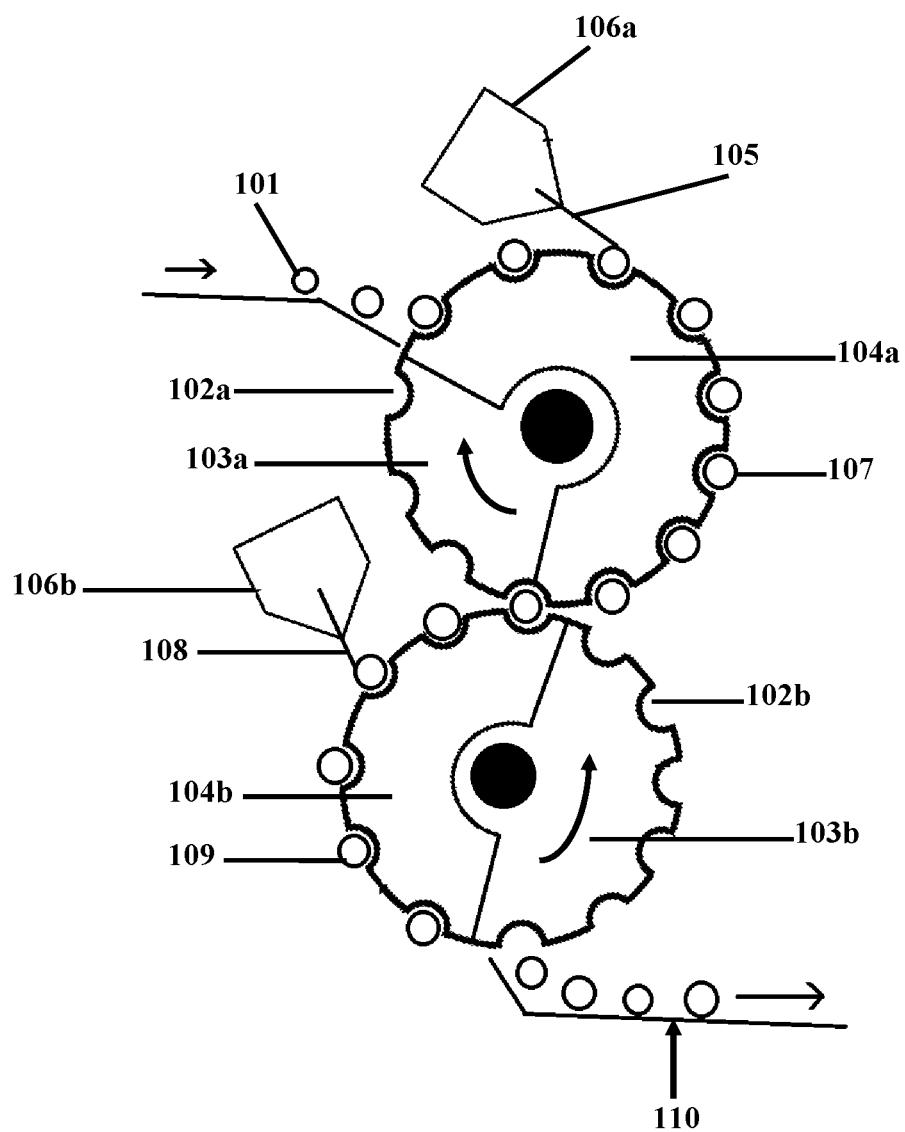
FIG. 1 illustrates a block diagram of a system for manufacturing the polymer coated fertilizers, according to an embodiment herein.

FIG. 1 illustrates a block diagram of a system for manufacturing the polymer coated fertilizers, according to an embodiment herein. With respect to FIG. 1, the fertilizer granule 101 is fed onto the cavity 102a of the first chill roll 103a. The fertilizer granule 101 is held into the first cavity 102a of the first chill roll 103a with a vacuum suction 104a through the tiny pores in the cavity 102a. Thereafter the first polymer film 105 from the first polymer extruder 106a is applied onto the fertilizer granule 101 held in a grid like pattern in the cavity 102a on the chill roll 103a. This creates a partially coated fertilizer 107. The partially coated fertilizer 107 is then transferred to the second chill roll 103b where this partially coated fertilizer 107 is held into the second cavity 102b by the vacuum suction 104b. The first cavity 102a of the first chill roll 103a is aligned in such a way that the cavity 102a of the chill roll 103a is facing the cavity 102b of the chill roll 103b while transferring the partially coated fertilizer 107. The transfer of the partially coated fertilizers 107 from the first chill roll 103a to second chill roll 103b exposes the uncoated part of the partially coated fertilizer 107. Thereafter the second polymer film 108 is extruded from the second polymer extruder 106b and this second polymer layer 108 is then coated onto the uncoated portion of partially coated fertilizer 107 encapsulating the fertilizer granules between the first polymer film 105 and the second polymer film 108. The second polymer film 108 coats and seals the coating by melting and fusing with first polymer film 105 thereby producing the polymer coated fertilizer 109. Thereafter these coated fertilizers 109 are sent to collection bin 110 for packaging.

According to one embodiment herein, the first chill roll 103a and the second chill roll 103b is replaced with a perforated steel belt with vacuum.

According to one embodiment herein, the cavity 102a is made of electrically conductive metal while the first chill roll 103a and the second chill roll 103b have a coating of electrically neutral material. According to one embodiment herein, the charged fertilizer granule are attracted towards the cavity 102a and the fertilize granules 101 are held in its place without the use of vacuum suction 104a, when electrically charged fertilizer granules 101 are fed onto the chill roll 103a.

According to one embodiment herein, the extruder 106a or extruder 106b have co-extrusion facility with an ability to extrude multiple layers of polymers.

According to one embodiment herein the extruders 106a and 106 b are replaced with a suitable coating devices such as, but not limited to, spray coating, curtain coating, powder coating, rod coating, thermal lamination coating, or UV lamination coating devices.

According to one embodiment herein, the fertilizer granule 101 is any one of rectangular, tablet, hemispherical, split pea, spike, shapes or any shape in which the fertilizers are available commercially.

According to one embodiment herein, the cavity 101 is rectangular, tablet, square, hemispherical, spike, or such shapes.

Figure 2:
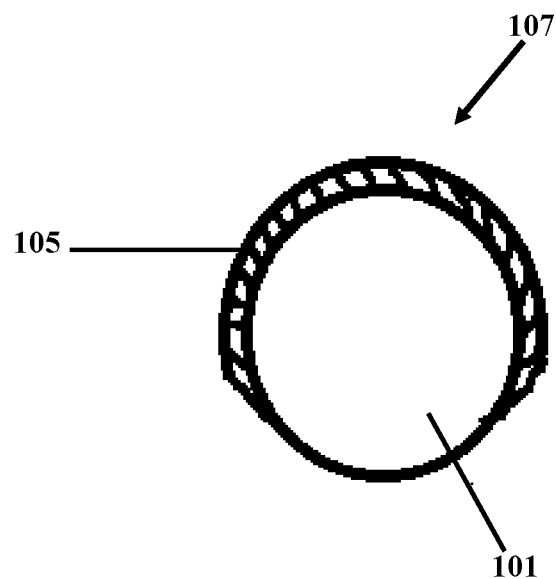
FIG. 2 illustrates a schematic view of a partially coated fertilizer granules obtained from a first chill roll in the system for manufacturing the polymer coated fertilizers, according to an embodiment herein.

FIG. 2 illustrates a schematic view of a partially coated fertilizer granules obtained from a first chill roll in the system for manufacturing the polymer coated fertilizers, according to an embodiment herein. With respect to FIG. 2 the fertilizer granule 101 is partially coated with the first polymer film 105 to obtain a partially coated fertilizer granule 107.

Figure 3:
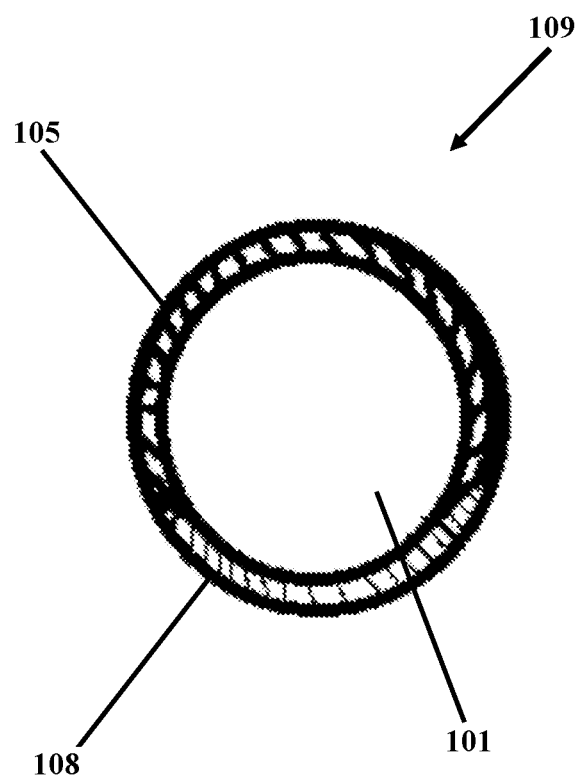
FIG. 3 illustrates a schematic view of the full coated fertilizer granules, obtained from a second chill roll in the system for manufacturing the polymer coated fertilizers, according to an embodiment herein.

FIG. 3 illustrates a schematic view of the full coated fertilizer granules, obtained from a second chill roll in the system for manufacturing the polymer coated fertilizers, according to an embodiment herein. With respect to FIG. 3 the full polymer-coated fertilizer granule 109 has the fertilizer granule 101 coated with the first polymer film 105 and the second polymer film 108 on the two opposite faces of the fertilizer granule so that the fertilizer granule is encapsulated between the first polymer film 105 and the second polymer film 108.

Figure 4:
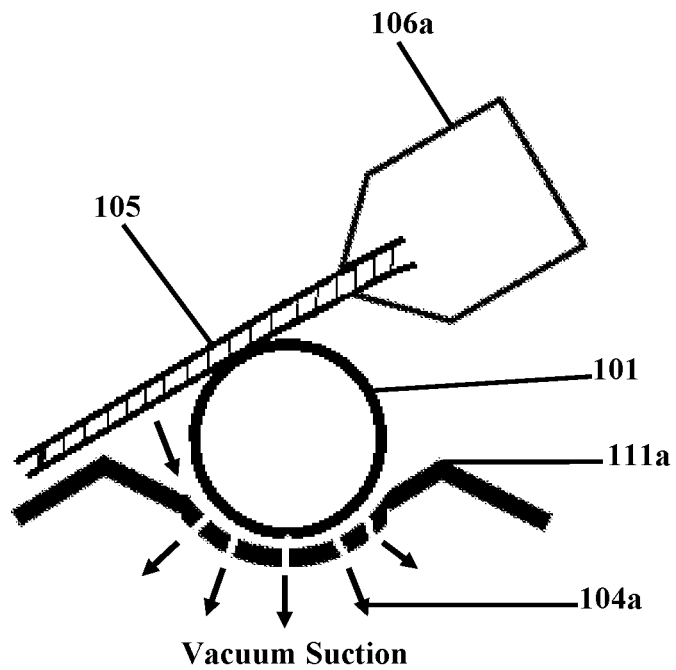
FIG. 4 illustrates a schematic view of a first machine for applying a first polymer film and the polymer film breaking mechanism in the system for manufacturing the polymer coated fertilizers, according to an embodiment herein.

FIG. 4 illustrates a schematic view of a first machine for applying a first polymer film and the polymer film breaking mechanism in the system for manufacturing the polymer coated fertilizers, according to an embodiment herein. With respect to FIG. 4, the chill roll surfaces have designs to assist the breakage of the film 105 while applied onto the fertilizer granule 101 from the extruder 106a. The design include but not limited to a sharp edge 111a, around the cavity that tears the film away while the film is being pulled under vacuum suction 104a around the fertilizer granule 101.

Figure 5:
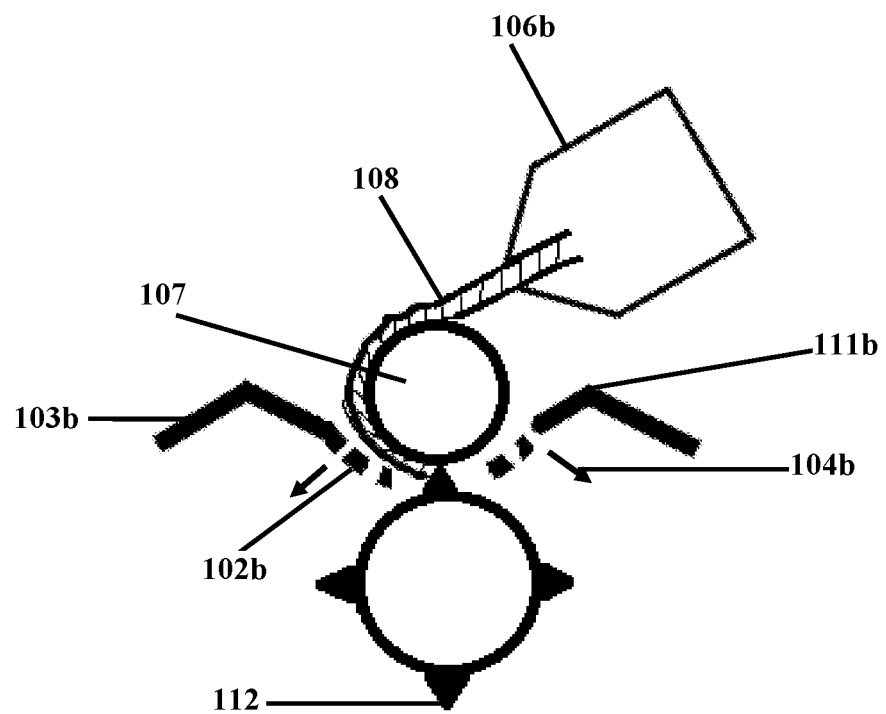
FIG. 5 illustrates a schematic view of a second machine for applying a second polymer film with the polymer film cutting mechanism and a rotary pin for pushing the fertilizer granules through the cavity in the system for manufacturing the polymer coated fertilizers, according to an embodiment herein.

FIG. 5 illustrates a schematic view of a second machine for applying a second polymer film with the polymer film cutting mechanism and a rotary pin for pushing the fertilizer granules through the cavity in the system for manufacturing the polymer coated fertilizers, according to an embodiment herein. With respect to FIG. 5, a rotary pin 112 is provided for pushing the fertilizer granules through the cavity. The chill rolls 103b has a rotary pin 112 aligned under the cavity 102b of the cylinder in such a way that the pins 112 push the partially coated fertilizer 107 up towards the polymer layer 108 right at the moment when the polymer layer 108 is being applied from the extruder 106b. The vacuum suction 104b is deployed to hold the partially coated fertilizer granule 107. The partially coated fertilizer granule 107 is held by the chill rolls 103b by vacuum suction 104b. The extruder 106b gives the second molten polymer film 108, to coat the partially coated fertilizer granule 107. The surface of the chill rolls 103b has sharp edge 111b to assist the breakage of the polymer film while applied onto the fertilizer granule 107. The design include but not limited to a sharp edge 111b, around the cavity that tears the film away while the film is being pulled under vacuum suction 104b around the fertilizer granule 107.

FIG. 6 illustrates a schematic view of a partially coated fertilizer pellet 107 obtained after the application of the first coating layer 105 for manufacturing the polymer coated fertilizers, according to an embodiment herein. With respect to FIG. 6 the first surface area 101a of the fertilizer granule 101 is coated with the first coating layer 105 having a continuous structure and an edge 105a to obtain a partially coated fertilizer pellet 107.

FIG. 7 illustrates a schematic view of the completely coated or encapsulated fertilizer pellet, obtained after the application of the second coating layer for manufacturing the polymer coated fertilizers, according to an embodiment herein. With respect to FIG. 7 the encapsulated fertilizer pellet 109 has the fertilizer pellet 101 coated with the first polymer film 105 covering the first surface area 101a of the fertilizer pellet 101, the second coating layer 108 covering the second surface area 101b of the fertilizer pellet 101, and an overlap layer formed by sealing the edge 105a of the first coating layer 105 with edge 108a of the second coating layer 108 on the surface of the fertilizer pellet 101. As illustrated in FIG. 7, the overlap layer runs along the circumference of the fertilizer pellet 101 encircling the fertilizer pellet, and the first coating layer and the second coating layer are on the opposite side of the overlap layer, the two opposite coating surfaces joined by the overlap layer completely encapsulate the fertilizer pellet 101 between the first coating layer 105 and the second coating layer 108 and the overlap layer 201.

FIG. 8 illustrates another schematic view of the completely coated fertilizer pellet, obtained after the application of the second coating layer for manufacturing the polymer coated pellet, according to an embodiment herein. As presented in FIG. 8 there are three layers covering the different parts of the surface of the fertilizer pellet; first coating layer 105 covers a first surface of the fertilizer pellet, 101 a second coating layer 108 covers a second surface of the fertilizer pellet 101, and overlap layer 201 covering a third surface of the fertilizer pellet 101. The overlap layer 201 comprises; a part of the first coating layer 105 and a part of the second coating layer 108 fused or laminated together to form a composite layer, wherein the overlap layer 201 is distinct from the first coating layer 105 and the second coating layer 108 and is visible as a distinct layer when seen through a microscope.

According to one embodiment herein, the steel belt is used to eliminate the use of first chill roll. In yet another embodiment of the invention a series of soft cushion protective rollers can be used on the surface of the chill roll gently pressing the granules onto the cylinder so that the granules do not fly off due to a centrifugal force of the rotating chill roll. Alternatively an air cushion is used to generate air jets or electrostatic charge on the granules to prevent a flying off of the granules from the rotating chill roll.

According to one embodiment herein, the layer of polymer contains various types of additives to enhance the properties of polymer such as fertilizer release rate through the polymer layer, biodegradation of the polymer layer, UV resistance of the polymer layer, resistance of temperature induced fertilizer release through the layer using talc and other minerals.

According to one embodiment herein, the surface of the coated granules comprises of water absorption chemicals such as superabsorbent.

According to one embodiment herein, the surface of the chemicals contains paper particles or cellulose particles attached to the surface of the coated granules. These cellulose particles are used to carry pesticides by absorbing the pesticides onto the cellulose particles attached to the coated surface.

According to one embodiment herein, the polymer film comprises of many polymer layers co-extruded as a single layer of polymer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language fall there between.

What is claimed is:

1. A polymer-coated fertilizer for use in agriculture production comprising:
   a) a solid pellet of material that includes a fertilizer, the solid pellet of material having a surface;
   b) a first coating layer having a continuous structure covering a first portion of the surface of the pellet, the first coating layer having a first edge at an end of the first coating layer, the first edge having a first end point on the surface of the pellet;
   c) a second coating layer having a continuous structure covering a second portion of the surface of the pellet, the second coating layer having a second edge at an end of the second coating layer, the second edge having a second end point spaced apart from the first end point in a direction along the surface of the pellet;
   d) an overlap layer covering a third portion of the surface of the pellet, the overlap layer being bounded by the first end point of the first coating layer and the second end point of the second coating layer, the second edge of the second coating layer forming a top portion of the overlap layer and the first edge of the coating layer forming a bottom portion of the overlap layer, the overlap layer being formed by bonding a part of the first coating layer with a part of the second coating layer on the surface of the fertilizer pellet to encapsulate the pellet between the first coating layer, the second coating layer, and the overlap layer, wherein the overlap layer is distinct from the first coating layer and the second coating layer; and
   a fertilizer encapsulated between the first coating layer, the second coating layer, and the overlap layer, the fertilizer being a controlled-release fertilizer that is releasable through at least one of the first coating layer, the second coating layer, and the overlap layer over a period of time.

2. The polymer-coated fertilizer of claim 1 wherein the fertilizer includes at least one of the following: an organic fertilizer, an inorganic fertilizer, a natural fertilizer, a synthetic fertilizer, a micronutrient, an insecticide, a fungicide, a herbicide, a nitrification inhibitor, a bioinoculant, a urease inhibitor, and an aluminum sulfate.

3. The polymer-coated fertilizer of claim 1 wherein the solid pellet of material includes one of the following: a tablet, a capsule, a briquette, and a granule.

4. The polymer-coated fertilizer of claim 1 wherein the first coating layer includes at least one of the following: a natural polymer, a synthetic polymer, a biodegradable polymer, a non-biodegradable polymer, a processing additive, a polymer stabilizing additive, an inorganic mineral, a biodegradation additive, a oxo-biodegradation additive, a nitrification inhibitor, a urease inhibitor, a hydrogel particle, an organic surfactant, an inorganic surfactant, a pigment, a chemical taggant, a physical taggant, a herbicide, an insecticide and a fungicide.

5. The polymer-coated fertilizer of claim 1 wherein the second coating layer includes at least one of the following: a natural polymer, a synthetic polymer, a biodegradable polymer, a non-biodegradable polymer, a polymer processing additive, a polymer stabilizing additive, an inorganic mineral, a biodegradation additive, a oxo-biodegradation additive, a nitrification inhibitor, a urease inhibitor, a hydrogel particle, an organic surfactant, an inorganic surfactant, a pigment, a chemical taggant, a physical taggant, a herbicide, an insecticide and a fungicide.

6. The polymer-coated fertilizer of claim 1 wherein at least one of the first coating layer and the second coating layer includes any film extrusion grade polymer of natural or synthetic origin.

7. The polymer-coated fertilizer of claim 1 wherein at least one of the first coating layer and the second coating layer has a water vapor transmission rate within the range of 1 g/(m$^2$·day) to 2000 g/(m$^2$·day).

8. The polymer-coated fertilizer of claim 1 wherein at least one of the first coating layer and the second coating layer is made up of multiple coating layers.

9. The polymer-coated fertilizer of claim 1 wherein the first coating layer and the second coating layer have the same thickness, and the overlap layer has a different thickness.

10. The polymer-coated fertilizer of claim 1 wherein the first coating layer, the second coating layer, and the overlap layer have different thicknesses.

11. The polymer-coated fertilizer of claim 1 wherein the fertilizer pellet has a diameter within a range of 2 mm to 150 mm.

12. The polymer-coated fertilizer of claim 1 wherein the fertilizer pellet is a urea tablet having a weight within a range of 100 mg to 800 mg.

13. The polymer-coated fertilizer of claim 1 wherein the overlap layer is formed by laminating an edge of the second coating layer with an edge of the first coating layer, wherein the overlap layer is distinct from the first coating layer and the second coating layer.

14. The polymer-coated fertilizer of claim 1 wherein the fertilizer includes any fertilizer for use in agriculture crops production.

15. The polymer-coated fertilizer of claim 1 wherein the first coating layer includes any polymer film that can be thermoformed.

16. The polymer-coated fertilizer of claim 1 wherein the second coating layer includes any polymer film that can be thermoformed.

17. A polymer-coated fertilizer comprising:
a solid pellet of material that includes a fertilizer, the solid pellet of material having a surface;
a first coating layer covering a first portion of the surface of the pellet, the first coating layer having a first edge at an end of the first coating layer, the first edge having a first end point on the surface of the pellet;
a second coating layer covering a second portion of the surface of the pellet, the second coating layer having a second edge at an end of the second coating layer, the second edge having a second end point spaced apart from the first end point in a direction along the surface of the pellet; and
a third coating layer covering a third surface of the fertilizer pellet, the third coating layer being bounded by the first end point of the first coating layer and the second end point of the second coating layer, the second edge of the second coating layer forming a top portion of the third coating layer and the first edge of the first coating layer forming a bottom portion of the third coating layer;
wherein the second coating layer covers a surface not covered by the first coating layer,
wherein the third coating layer covers a surface not covered by the second coating layer, and
wherein the third coating layer is distinct from the first coating layer and the second coating layer; and
a fertilizer encapsulated between the first coating layer, the second coating layer, and the third coating layer, the fertilizer being a controlled-release fertilizer that is releasable through at least one of the first coating layer, the second coating layer, and the third coating layer over a period of time.

18. The polymer-coated fertilizer of claim 17 wherein the fertilizer includes any fertilizer for use in agriculture crops production.

19. The polymer-coated fertilizer of claim 17 wherein the first coating layer and the second coating layer includes any polymer that can be melt extruded into a film form.

20. The polymer-coated fertilizer of claim 17 wherein at least one of the first coating layer and the second coating layer comprise multiple coating layers.

21. The polymer-coated fertilizer of claim 1 wherein the first coating layer is deposited onto the surface under a pulling force causing the first coating layer to encapsulate the first surface and the third surface before the second coating layer is deposited onto the surface and the first coating layer causing the second coating layer to encapsulate the second surface and the portion of the first coating layer on the third surface.

22. The polymer-coated fertilizer of claim 13 wherein the first coating layer is deposited onto the surface under a pulling force causing the first coating layer to wrap around the surface before the second coating layer is deposited under a pulling force so that the edge of the first coating layer is interior to the edge of the second coating layer in the overlap layer.

23. The polymer-coated fertilizer of claim 13 wherein the edge of the first coating layer is interior to the edge of the second coating layer in the overlap layer.

24. The polymer-coated fertilizer of claim 13 wherein the edge of the first coating layer is wholly interior to the edge of the second coating layer in the overlap layer.

25. The polymer-coated fertilizer of claim 1 wherein the controlled release fertilizer is releasable through the overlap layer.

26. The polymer-coated fertilizer of claim 17 wherein the first coating layer is wholly interior to the second coating layer over the third surface.

27. The polymer-coated fertilizer of claim 17 wherein the first coating layer is deposited onto the surface under a pulling force causing the first coating layer to encapsulate the first surface and the third surface before the second coating layer is deposited onto the second surface and the first coating layer causing the second coating layer to encapsulate the second surface and the portion of the first coating layer on the third surface.

* * * * *